(12) United States Patent
Yin

(10) Patent No.: US 12,238,241 B2
(45) Date of Patent: Feb. 25, 2025

(54) INTERFACE DISPLAY METHOD AND ELECTRONIC DEVICE

(71) Applicant: Honor Device Co., Ltd., Shenzhen (CN)

(72) Inventor: Jie Yin, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/924,579

(22) PCT Filed: Apr. 13, 2022

(86) PCT No.: PCT/CN2022/086592
§ 371 (c)(1),
(2) Date: Nov. 10, 2022

(87) PCT Pub. No.: WO2022/262397
PCT Pub. Date: Dec. 22, 2022

(65) Prior Publication Data
US 2024/0223694 A1 Jul. 4, 2024

(30) Foreign Application Priority Data
Jun. 16, 2021 (CN) .......................... 202110668483.2

(51) Int. Cl.
*H04M 1/72* (2021.01)
*H04M 1/72436* (2021.01)
(Continued)

(52) U.S. Cl.
CPC ... *H04M 1/72484* (2021.01); *H04M 1/72436* (2021.01); *H04W 8/183* (2013.01)

(58) Field of Classification Search
CPC ......... H04M 1/72484; H04M 1/72436; H04W 8/183
(Continued)

(56) References Cited

U.S. PATENT DOCUMENTS

2007/0206736 A1 9/2007 Sprigg et al.
2012/0196581 A1* 8/2012 Papakipos ............... H04W 4/16
455/415
(Continued)

FOREIGN PATENT DOCUMENTS

CN 104427074 A 3/2015
CN 104572946 A 4/2015
(Continued)

*Primary Examiner* — Ahmad F. Matar
*Assistant Examiner* — Jirapon Tulop
(74) *Attorney, Agent, or Firm* — Leydig, Voit & Mayer, Ltd.

(57) ABSTRACT

An interface display method and an electronic device are disclosed. A call application obtains a first phone number of a peer end of a call; after a first data source application is authenticated successfully, the call application obtains first user description information corresponding to the first phone number from the first data source application, where the first user description information is used to record information of a user corresponding to the first phone number; and the call application displays the first user description information in a call-related interface of the first phone number. In this application, more information about a user on a peer end of a call can be displayed in a call-related interface, thereby improving user experience.

20 Claims, 25 Drawing Sheets

(51) Int. Cl.
*H04M 1/72484* (2021.01)
*H04W 8/18* (2009.01)

(58) Field of Classification Search
USPC .......................................................... 455/415
See application file for complete search history.

(56) References Cited

U.S. PATENT DOCUMENTS

2013/0288649 A1    10/2013   Dave et al.
2020/0322480 A1*   10/2020   Sena, Jr. ........... H04M 3/42042

FOREIGN PATENT DOCUMENTS

| | | |
|---|---|---|
| CN | 105491127 A | 4/2016 |
| CN | 105791499 A | 7/2016 |
| CN | 107205096 A | 9/2017 |
| CN | 107438129 A | 12/2017 |
| CN | 112887488 A | 6/2021 |
| CN | 113596226 A | 11/2021 |
| WO | 2007098508 A1 | 8/2007 |

* cited by examiner

INTERFACE DISPLAY METHOD AND ELECTRONIC DEVICE

CROSS-REFERENCE TO RELATED APPLICATIONS

This application is a national stage of International Application No. PCT/CN2022/086592, filed on Apr. 13, 2022, which claims priority to Chinese Patent Application No. 202110668483.2, filed on Jun. 16, 2021. Both of the aforementioned applications are hereby incorporated by reference in their entireties.

TECHNICAL FIELD

This application relates to the field of intelligent terminal technologies, and in particular, to an interface display method and an electronic device.

BACKGROUND

Currently, when a user uses an electronic device to implement a call, if a phone number of a peer end of the call is stored in an address book, the electronic device displays a name corresponding to the phone number in the address book in a call-related interface such as an incoming call interface, an outgoing call interface, or an in-call interface. If the phone number of the peer end of the call is not stored in the address book, the phone number is a strange number and the electronic device displays only the phone number of the peer end of the call in the call-related interface. Therefore, the user obtains less information about the peer end of the call from the call-related interface, which affects user experience.

SUMMARY

This application provides an interface display method and an electronic device, so as to display relatively more user information of a peer end of a call in a call-related interface, thereby improving user experience.

According to a first aspect, embodiments of this application provide an interface display method, including: A call application obtains a first phone number of a peer end of a call; after a first data source application is authenticated successfully, the call application obtains first user description information corresponding to the first phone number from the first data source application, where the first user description information is used to record information about a user corresponding to the first phone number; and the call application displays the first user description information in a call-related interface of the first phone number. In the method, the first user description information of the first phone number is obtained from the first data source application, and the first user description information is displayed in the call-related interface. Through the foregoing processing, relatively more information about a user on a peer end of a call can be displayed in the call-related interface, thereby improving call experience of a user.

In a possible implementation, that the first data source application is authenticated successfully includes: obtaining authentication information of the first data source application and authenticating the authentication information of the first data source application successfully.

In a possible implementation, that the call application obtains first user description information corresponding to the first phone number from the first data source application includes: The call application sends a first message to the first data source application, where the first message includes the first phone number, and the first message is used to request user description information corresponding to the first phone number; and the call application receives a second message sent by the first data source application, where the second message includes the first user description information.

In a possible implementation, before the call application receives a second message sent by the first data source application, the method further includes: The call application sends an authentication request message to the first data source application, where the authentication request message includes authentication information of the call application, so that the first data source application successfully authenticates authentication information of the call application.

In a possible implementation, the method further includes: The call application obtains the user description information corresponding to the first phone number from at least one data source application, where the user description information is used to record information about the user corresponding to the first phone number, and the at least one data source application is different from the first data source application; and the call application displays the user description information obtained from the at least one data source application in the call-related interface of the first phone number.

In a possible implementation, that the call application displays the first user description information and the user description information obtained from the at least one data source application in the call-related interface of the first phone number includes: The call application selects at least one piece of user description information from the first user description information and the user description information obtained from the at least one data source application, and displays the at least one piece of user description information in the call-related interface.

In a possible implementation, that the call application displays the first user description information and the user description information obtained from the at least one data source in the call-related interface of the first phone number includes: The call application successively displays the first user description information and the user description information obtained from the at least one data source in the call-related interface of the first phone number in a specified sequence; or the call application displays the first user description information and the user description information obtained from the at least one data source in different specified areas of the call-related interface in a specified sequence.

In a possible implementation, the specified sequence includes: a preset priority sequence of the first data source application and the at least one data source; or a time sequence in which the user description information is obtained from the first data source application and the at least one data source.

In a possible implementation, the method further includes: If the user description information corresponding to the first phone number is not obtained from the first data source application, the call application obtains second user description information corresponding to the first phone number from second data source, where the second user description information is used to record information about the user corresponding to the first phone number, and the second data source is different from the first data source application; and the call application displays the second user description information in the call-related interface of the first phone number.

In a possible implementation, before the first data source application is authenticated successfully, the method further includes: determining that the first data source application is in a logged-in state.

In a possible implementation, before the first data source application is authenticated successfully, the method further includes: The call application determines that the first phone number is not stored in an address book of an electronic device.

In a possible implementation, after the call application displays the first user description information in the call-related interface of the first phone number, the method further includes: The call application stores the first user description information in a call record of the first phone number; and the call application receives a call record query operation for the first phone number, and displays the first user description information in a call record display interface of the first phone number.

In a possible implementation, after the call application receives the call record query operation for the first phone number, and before the call application displays the first user description information in the call record display interface of the first phone number, the method further includes: detecting that an account currently logged in by the first data source application is a first account, where the first account is an account logged in by the first data source application when the first user description information is obtained from the first data source application.

In a possible implementation, the method further includes: if it is detected that an account that is currently logged in by the first data source application is switched to a second account, obtaining third user description information corresponding to the first phone number from the first data source application that has logged in to the second account; and displaying the third user description information in the call record display interface of the first phone number.

In a possible implementation, the authentication information includes a packet name and/or a signature.

In a possible implementation, if the authentication information includes a packet name and a signature, that the call application authenticates the authentication information of the first data source application successfully includes: searching for the packet name from a preset whitelist by the call application; and if the packet name is found, determining that a signature corresponding to the packet name in the whitelist is consistent with the signature in the authentication information.

In a possible implementation, the method further includes: when user description information is displayed in the call-related interface, correspondingly displaying information about a data source to which the user description information belongs.

In a possible implementation, the first data source application includes a communication application, or a yellow page application, or a blacklist application, or a number marking application, or a cloud server and the cloud server records user description information corresponding to a phone number. The second data source includes the address book of the electronic device, or a communication application, or a blacklist application, or a number marking application, or a cloud server. The user description information includes: employee information, merchant information, marking information, and/or blacklist information.

According to a second aspect, an embodiment of this application provides an electronic device, where the electronic device includes a memory configured to store a computer program instruction and a processor configured to execute a program instruction, and when the computer program instruction is executed by the processor, the electronic device is triggered to execute the method according to any one of the first aspect.

According to a third aspect, an embodiment of this application provides a computer-readable storage medium. The computer-readable storage medium stores a computer program. When the computer program runs on a computer, the computer is enabled to execute the method in any one of the first aspect.

According to a fourth aspect, an embodiment of this application provides a computer program product. The computer program product includes a computer program. When the computer program runs on a computer, the computer is enabled to execute the method in any one of the first aspect.

According to a fifth aspect, an embodiment of this application provides a computer program. When the computer program is executed by a computer, the method in the first aspect is performed.

In a possible design, the program in the fifth aspect may be completely or partially stored in a storage medium encapsulated with a processor, or may be partially or completely stored in a memory not encapsulated with the processor.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Terms used in implementation manners of this application are merely used to explain specific embodiments of this application, and are not intended to limit this application.

Currently, when a user uses an electronic device to implement a call, if a phone number of a peer end of the call is stored in an address book, the electronic device displays a name corresponding to the phone number in the address book in a call-related interface such as an incoming call interface, an outgoing call interface, or an in-call interface. If the phone number of the peer end of the call is not stored in the address book, the phone number is a strange number and the electronic device displays only the phone number of the peer end of the call in the call-related interface. In this case, the user learns less user information of the peer end of the call from the call-related interface, which affects user experience.

Figure 1A:
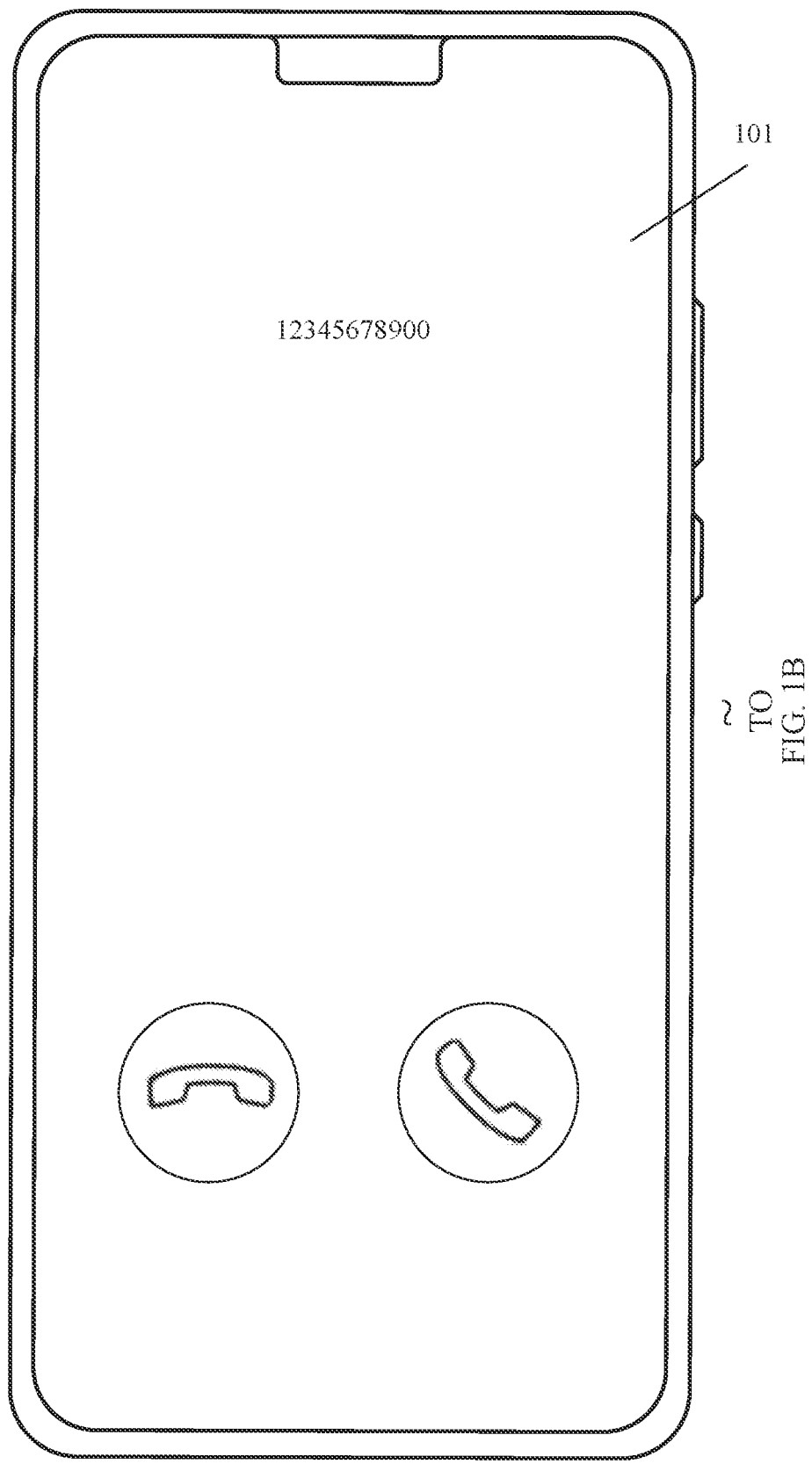
FIG. 1A to FIG. 1C are a schematic diagram of a call-related interface when a phone number at a peer end of a call is a strange number in the prior art.

The foregoing incoming call interface refers to an interface displayed when the electronic device serves as a called party and receives a call, for example, an interface 101 shown in FIG. 1A. The outgoing call interface refers to an interface displayed when the electronic device serves as a calling party and makes a call, for example, an interface 102 shown in FIG. 1B. The in-call interface refers to an interface displayed after a call is started with a peer end and the electronic device serves as a calling party or a called party, for example, an interface 103 shown in FIG. 1C.

In this embodiment of this application, interfaces involved in a call process such as a dialing interface, an incoming call interface, an outgoing call interface, and an in-call interface are collectively referred to as call-related interfaces.

Figure 1B:
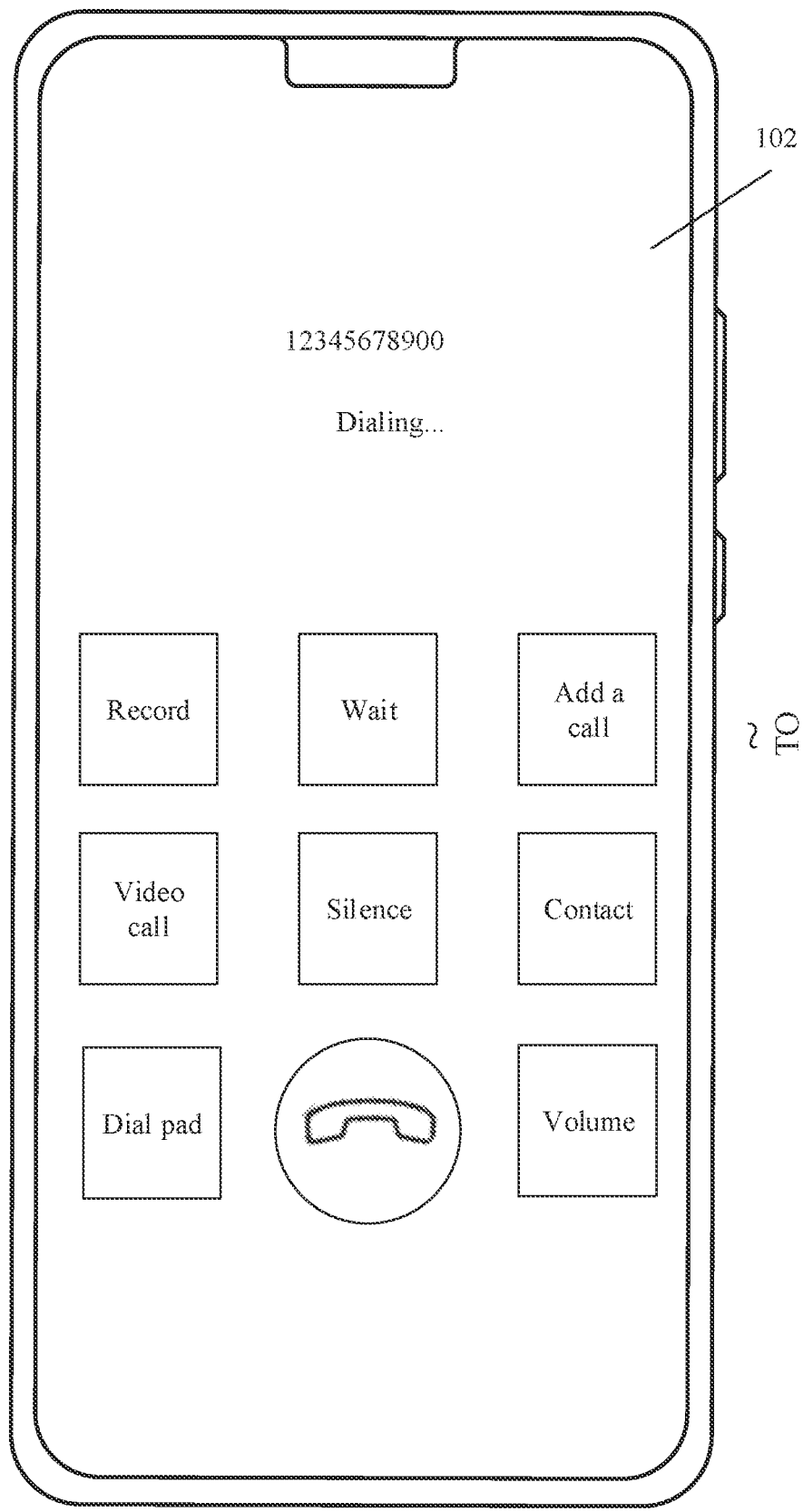
Figure 1C:
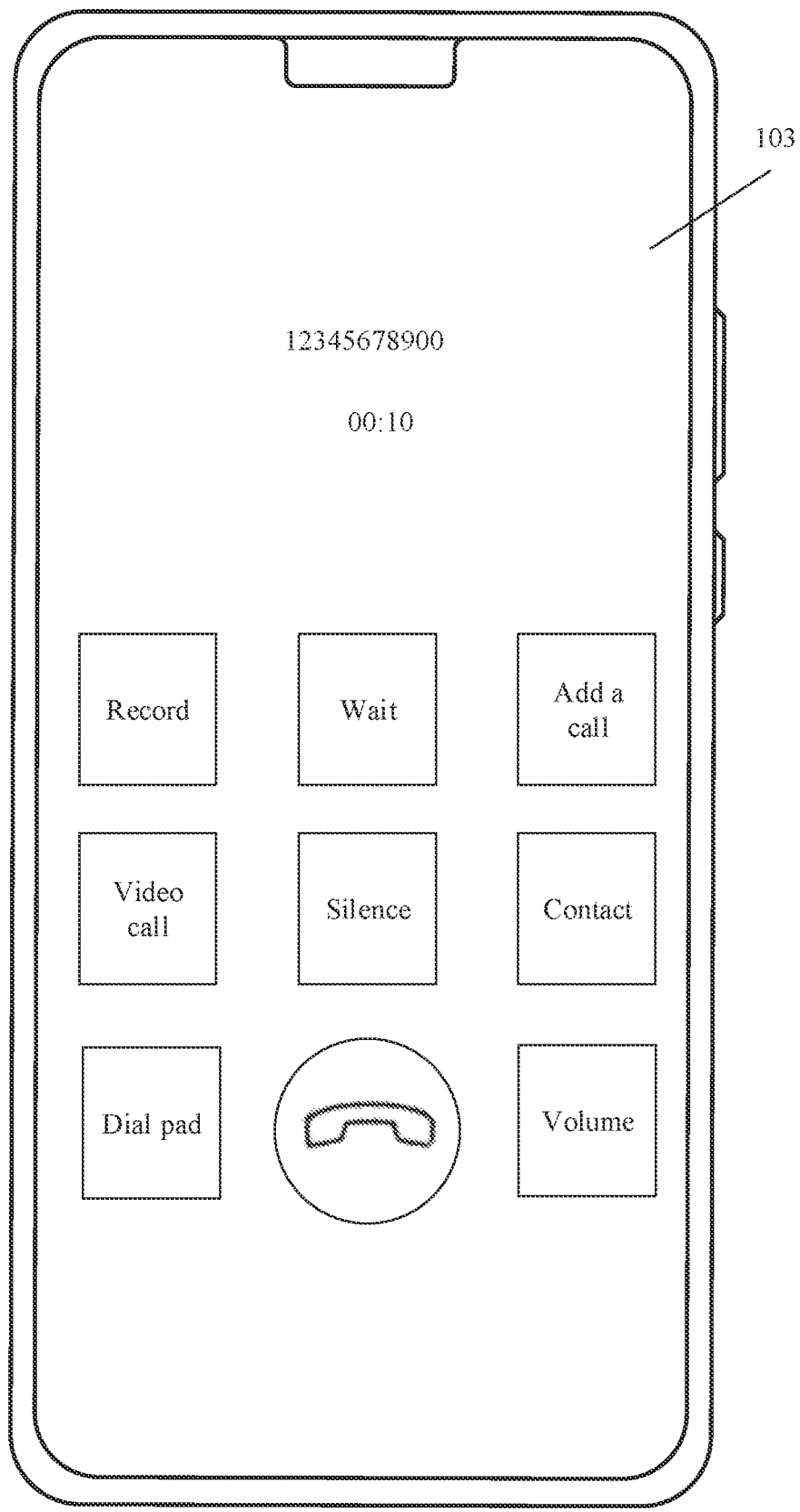

For example, the electronic device is a mobile phone, and a call is made between a mobile phone 1 and a mobile phone 2. If a phone number "12345678900" of the mobile phone 2 is not stored in an address book of the mobile phone 1, when a call is made between the mobile phone 1 and the mobile phone 2, an incoming call interface, an outgoing call interface, and an in-call interface are shown in FIG. 1A to FIG. 1C, and information about the peer end of the call displayed in the foregoing call-related interfaces is generally the phone number "12345678900". The foregoing call-related interfaces are of little help for a user of the mobile phone 1 to learn user information about the peer end of the call, which affects user experience. Even if the user information of the peer end of the call is stored in the address book of mobile phone 1, because of a limitation of information recorded in the address book, only a name of a user of the peer end of the call is displayed in the call-related interfaces. If it is an unfamiliar person, the name of the peer end of the call may not necessarily serve as a reminder for the user, and may still affect the user's call experience.

Therefore, this application provides an interface display method. In a call process, the electronic device can display relatively more user information of a peer end of a call in a call-related interface, thereby improving user experience.

Currently, there are many communication applications. The communication application in this embodiment of this application refers to application software that can implement online chat and communication between users. A specific communication application is not limited in this embodiment of this application.

During work, in order to communicate conveniently and efficiently between employees within an enterprise, the employees within the enterprise usually communicate with each other on a specified communication application. In the communication application, an enterprise may be established by using an enterprise administrator account, and enterprise data, such as employee information in the enterprise, may be set. The employee information in the enterprise may include but is not limited to a name, a department in the enterprise, a position, a phone number, and a communication application account. The foregoing enterprise data may be stored in a remote server of the communication application. The enterprise administrator account may edit the foregoing employee information stored in the remote server, set viewing permission of the enterprise employee information, and set permission of an employee's account to view the enterprise employee information, and to initiate a call to other employees in the enterprise by using the enterprise employee information, to ensure security of the enterprise employee information. In addition, a communication application provider may also provide different function usage permission for accounts of different enterprise employees based on enterprise customization.

Optionally, an enterprise server may send enterprise data to the remote server of the communication application, or update the enterprise data stored in the remote server.

After installing the communication application in the electronic device, the user logs in to the communication application with an account. If the account and employee information corresponding to the account are prestored in the enterprise data, the account may be associated with enterprise and employee information. Alternatively, if the account is not stored in the enterprise data, the user may set the associated enterprise and employee information in the account. If the user has permission, the user can modify the employee information associated with the account, such as name, department in the enterprise, position, and phone number, so as to update corresponding data stored in the remote server.

An enterprise A is used as an example. The remote server may finally store employee information of several employees of the enterprise A, as shown in the following Table 1.

TABLE 1

| Department | Position | Name | Phone number | Account |
|---|---|---|---|---|
| Department 1 | Team leader | Zhao xx | 12345678911 | Account 1 |
| Department 1 | Team member | Qian xx | 12345678922 | Account 2 |
| Department 2 | Team leader | Sun xx | 12345678933 | Account 3 |
| ... | ... | ... | ... | ... |

After logging in to the communication application with an account, the user may request to view the employee information of the enterprise to which the user belongs. In this case, the communication application can obtain the employee information of the enterprise associated with the account from the remote server and display the information to the user. For example, after the employee Zhao xx in the enterprise A logs in to the communication application in an electronic device of his own with the account 1, an enterprise employee information viewing function provided by the communication application may be selected. Correspondingly, the communication application may obtain, from the remote server, the employee information of the enterprise A associated with the account 1, for example, the foregoing Table 1, and displays the obtained employee information of the enterprise A in an interface of the electronic device for the user Zhao xx to view.

It should be noted that because update frequency of the enterprise employee information is relatively low, the communication application may store the enterprise employee information obtained by the communication application from the remote server, for example, the Table 1 in the electronic device in which the communication application is located, and set valid duration for the communication application. In the valid duration, if the user requests to view the enterprise employee information, the communication application displays the stored enterprise employee information to the user. If the valid duration expires, the communication application obtains the employee information of the enterprise associated with the account from the remote server again, displays the newly obtained enterprise employee information to the user, and updates the enterprise employee information stored in the electronic device.

It should be noted that, in the foregoing description, that an account is associated with an enterprise is used as an example. In actual application, an account may be associated with several enterprises, and when logging in to the account in a communication application, the communication application may obtain, from a remote server, employee information of several enterprises associated with the account.

In an example provided in this application, the following applications are disposed in the electronic device: a contact application and a call application. The call application is used to display an incoming call interface, an outgoing call interface, and an in-call interface to a user, and complete corresponding data processing corresponding to the foregoing interfaces, for example, send a call request to an operator network side by using the electronic device, and receive a request sent by the operator network side. The contact application is used to provide a user with an interface such as a call record main interface, a call record detail interface, an address book main interface, a contact detail interface, and a dialing interface, and complete corresponding data processing corresponding to the foregoing interfaces. It should be noted that the foregoing applications are only examples. In actual application, implementation of a call application and a contact application in an electronic device may be different based on different functional division of application implementation. For example, the call application and the contact application are implemented by using one application, or a function of the foregoing call application is different from that of the contact application.

In the interface display method provided in this embodiment of this application, in addition to using a local address book of an electronic device as an information source, employee information of an enterprise associated with an account in the foregoing communication application is further used as an information source to obtain employee information corresponding to a phone number of a peer end of a call, and the obtained employee information is displayed in a call-related interface, so as to provide more user information of the peer end of the call for a user, thereby improving user experience.

Figure 2A:
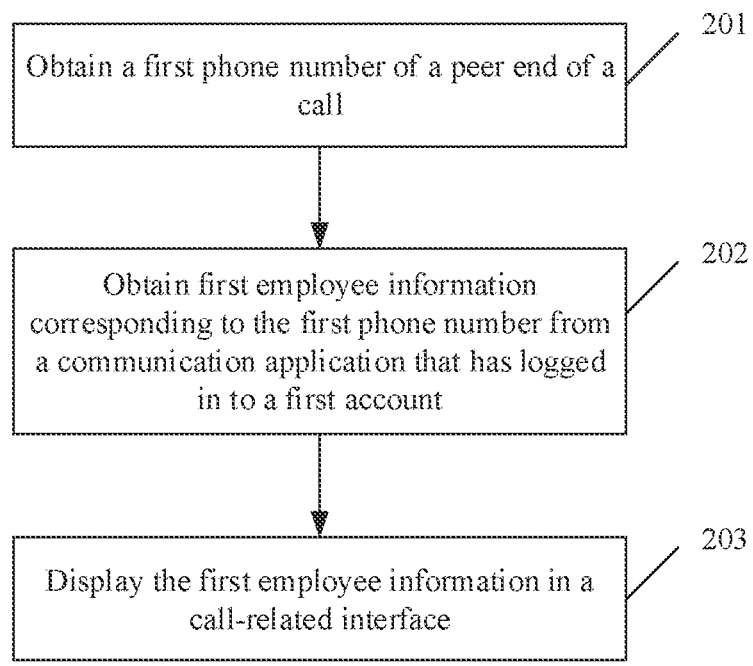
FIG. 2A is a flowchart of an embodiment of an interface display method according to this application.

FIG. 2A is a flowchart of an embodiment of an interface display method of this application. As shown in FIG. 2A, the method may include the following steps:

Step 201: Obtain a first phone number of a peer end of a call.

This step involves two application scenarios: an incoming call and an outgoing call.

For the incoming call scenario, an electronic device receives an incoming call message sent by an operator network side, and starts an incoming call process. In this case, the electronic device may obtain the first phone number of the peer end of the call from a call application or a contact application.

Figure 3:
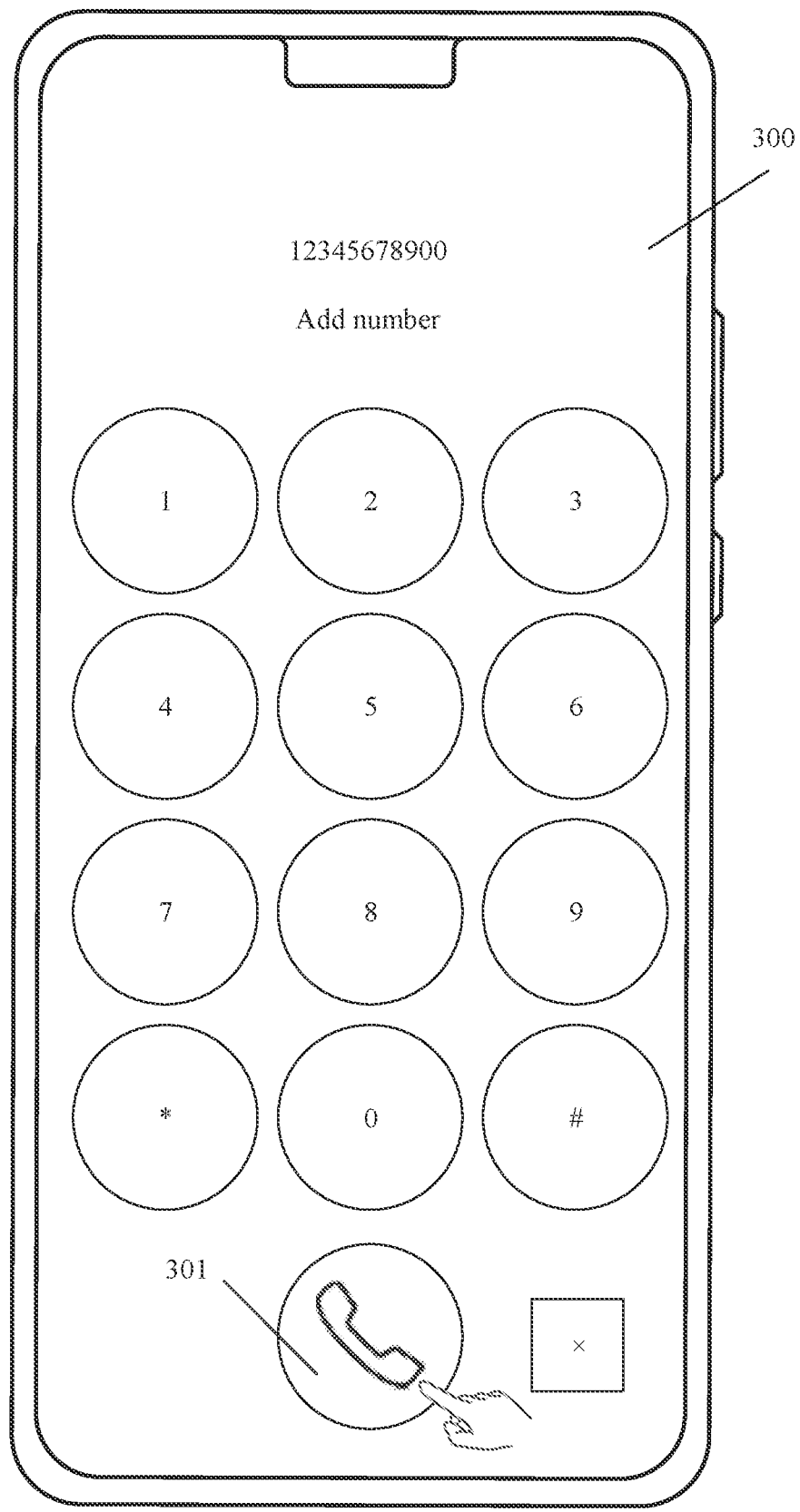
FIG. 3 is a diagram of an example of a dialing interface according to an embodiment of this application.

For the outgoing call scenario, a user may open a dialing interface of the electronic device, for example, a dialing interface 300 shown in FIG. 3. The user enters a phone number that needs to be dialed, for example, "12345678900" shown in FIG. 3, and selects a "dialing" control 301. Correspondingly, the electronic device receives a dialing operation of the user, and may obtain a phone number that is entered by the user in the dialing interface 300, that is, a phone number at a peer end of a call, for example, "12345678900" shown in FIG. 3. Alternatively, the electronic device may obtain, in a process in which the user enters the phone number that needs to be dialed, the phone number that is entered by the user in the dialing interface 300 in real time as the phone number of the peer end of the call. For example, in a process in which the user enters "12345678900" in the dialing interface 300, the electronic device may obtain, in real time, a part of the phone number "1", "12", 123" and the like that have been entered by the user as the phone number of the peer end of the call, and the following steps are triggered.

Step 202: Obtain first employee information corresponding to the first phone number from a communication application that has logged in to a first account, where the communication application records employee information of an enterprise associated with the first account.

This step may include:

A first application sends a first message to the communication application, where the first message may include the first phone number, and the first message is used to request first employee information corresponding to the first phone number.

The first application receives a second message fed back by the communication application, where the second message carries the first employee information corresponding to the first phone number found by the communication application.

The first application may be an application that is set in an electronic device and that is used to obtain employee information from a communication application, for example, may be a call application, or may be an application other than a call application.

Optionally, when the foregoing information query is performed between the first application and the communication application, the information query interface between the first application and the communication application may be implemented by using a standard interface provided by an operating system of the electronic device, or may be customized by a developer of the first application and the communication application. For example, the operating system of the electronic device is an Android system. The Android system includes a ContentProvider component, and the component may share data between applications of the Android system in a standardized manner. A standard interface defined by the ContentProvider component may be used between the first application and the communication application to query employee information. The first application may obtain, based on the first phone number and a predefined query parameter, a uniform resource identifier (URI) for querying the employee information corresponding to the first phone number from a database of the communication application. Correspondingly, the communication application may return a corresponding search result to the first application. Information carried in the search result may be specified by using a column name. For example, it is assumed that the search result is expected to carry a name, an account, and a department of an employee. In this case, a return value sent by the communication application to the first application may be predefined as shown in the following Table 2.

TABLE 2

| Column name | Description | Value |
|---|---|---|
| name | Employee name | String type |
| employeeid | Employee account | String type |
| Department | Employee department | String type |

Optionally, before sending the first phone number to the communication application by using the first message, the first application may perform validity detection and/or formatting processing on the phone number, so as to convert the phone number into a valid number that meets a requirement of the communication application.

The validity detection may include but is not limited to: remove some non-numeric characters included in the phone number, for example, ".", ",", and ";".

The formatting process is mainly to convert a phone number into a number that meets a preset format requirement. For example, if a phone number is "+86 12345678900" with a prefix "+86", and a phone number is required to have no prefix such as "+86" "0086" in a preset format requirement, the above-mentioned number "+86 12345678900" may be formatted as a number "12345678900" by formatting processing. For another example, if a phone number is "12345678900" and does not have a prefix "+86", and a phone number is required to have a prefix "+86" in a preset format requirement, the above-mentioned number "12345678900" may be formatted as a number "+8612345678900" by formatting processing.

Optionally, for security of communication between the first application and the communication application, mutual authentication may be performed between the first application and the communication application. After authentication between the two parties succeeds, data exchange may be performed between the first user and the communication application. The foregoing authentication may be verifying a packet name and/or a signature of a peer end application. An application package name is a unique identifier applied to a device, and an application signature is used to uniquely identify an application developer.

In an example in which a packet name and a signature of the communication application are verified, a process in which the first application authenticates the communication application is described as follows: A whitelist may be preset in the electronic device, and packet names and signatures of several applications are recorded in the whitelist. The first application obtains the packet name and the signature of the communication application, and compares the packet name and the signature with the packet names and the signatures of the applications in the whitelist. If the packet name and the signature are consistent with those of one of the applications, authentication succeeds; otherwise, authentication fails. For an authentication process of the communication application for the first application, refer to the foregoing authentication process. Details are not described herein again.

Figure 2B:
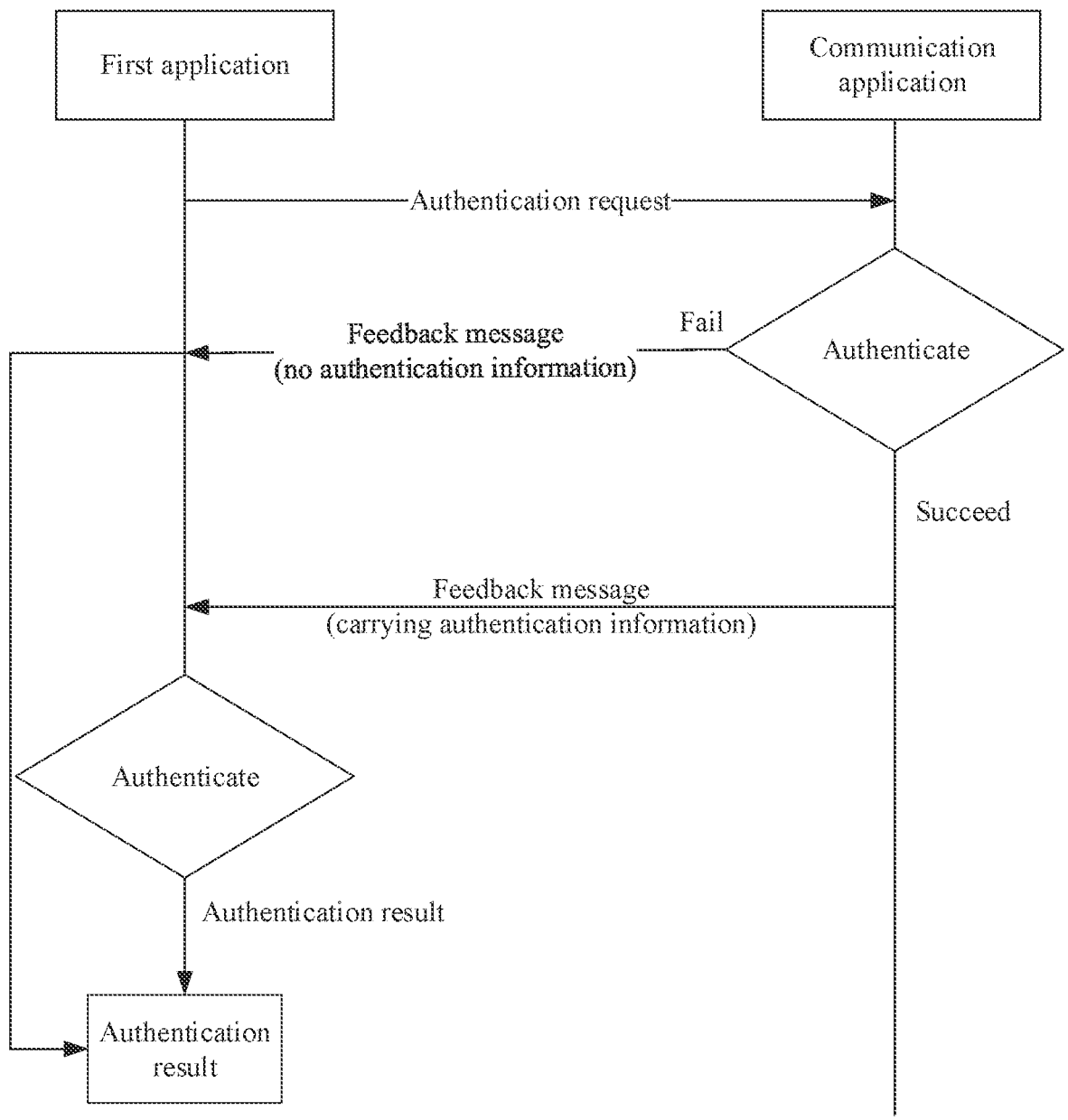
FIG. 2B is a flowchart of authentication between a first application and a communication application according to this application.

The following describes a process of mutual authentication between the first application and the communication application by using an example. Referring to FIG. 2B:

The first application sends an authentication request to the communication application, where the authentication request carries a packet name and a signature of the first application; and the communication application receives the authentication request, performs authentication on the packet name and the signature of the first application, and sends a feedback message to the first application based on the authentication result. If the authentication succeeds, the feedback message may carry the packet name and the signature of the communication application. If the authentication fails, the feedback message may carry information used to indicate that the authentication fails.

The first application receives the feedback message, and if the feedback message indicates that the authentication fails, an authentication procedure ends. If the feedback message carries the packet name and signature of the communication application, authentication is performed on the packet name and signature of the communication application to obtain an authentication result, and the authentication procedure ends.

In another possible implementation, the first application may also invoke a preset authentication application in the electronic device to implement authentication with the communication application by using the authentication application.

If authentication on the communication application by the first application succeeds, the first application may send the foregoing first message to the communication application, so as to obtain the employee information.

An implementation method of searching, by the communication application, for the first employee information corresponding to the first phone number is described.

In a possible implementation, if the communication application stores the employee information of the enterprise associated with the first account, and storage time is within a valid duration, the communication application may find the employee information corresponding to the first phone number from the employee information of the enterprise associated with the first account locally stored in the electronic device.

In another possible implementation, if the valid duration of the employee information of the enterprise associated with the first account stored in the electronic device by the communication application expires, the communication application may send a third message to a remote server of the communication application by using the electronic device, where the third message carries the first account and the first phone number. The remote server finds, from the employee information of the enterprise associated with the first account, the first employee information corresponding to the first phone number, and feeds back a fourth message to the communication application, where the fourth message carries the foregoing first employee information.

In still another possible implementation, if the valid duration of the employee information of the enterprise associated with the first account stored in the electronic device by the communication application expires, the communication application may re-obtain the employee information of the enterprise associated with the first account from the remote server, update the locally stored employee information, and obtain, from the updated employee information, the first employee information corresponding to the first phone number.

The first employee information may include but is not limited to enterprise information, department information, name information, job information, and work number information.

It should be noted that if the first phone number obtained in step 201 is a complete phone number of a user, employee information of one employee is usually obtained from the communication application. If the first phone number obtained in step 201 is not a complete phone number of the user, for example, in step 201, the electronic device obtains, in real time from the dialing interface, the phone number "1" or "12" that the user has entered, employee information of several employees may be obtained from the communication application. This is not limited in this embodiment of this application.

Step 203: Display the first employee information in a call-related interface of the first phone number.

Similar to step 201, this step relates to two application scenarios: the incoming call and the outgoing call.

For the incoming call scenario, the first employee information may be displayed in the incoming call interface. Further, the user performs a selection operation on an "answer" control in the incoming call interface. Correspondingly, the electronic device may receive the answer operation of the user. The electronic device displays the in-call interface, and may also display the first employee information in the in-call interface.

For the outgoing call scenario, the first employee information may be displayed in the dialing interface and/or the outgoing call interface. Further, the peer end of the call receives the call, and the electronic device displays the in-call interface. The in-call interface may also display the first employee information.

Figures 1, 4A:
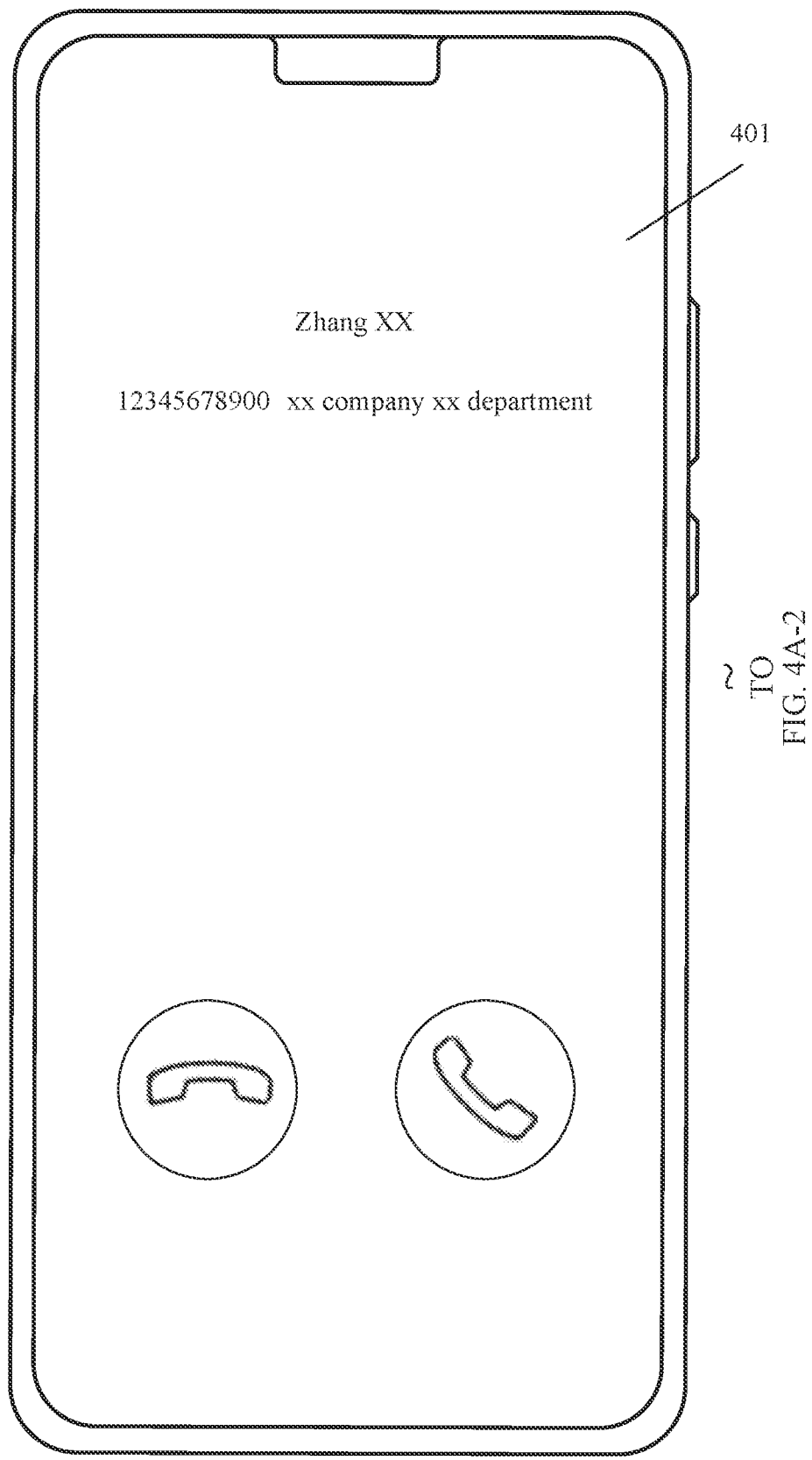
FIG. 4A-1 to FIG. 4C are schematic diagrams of call-related interfaces in an interface display method according to this application.
Figures 2, 4A:
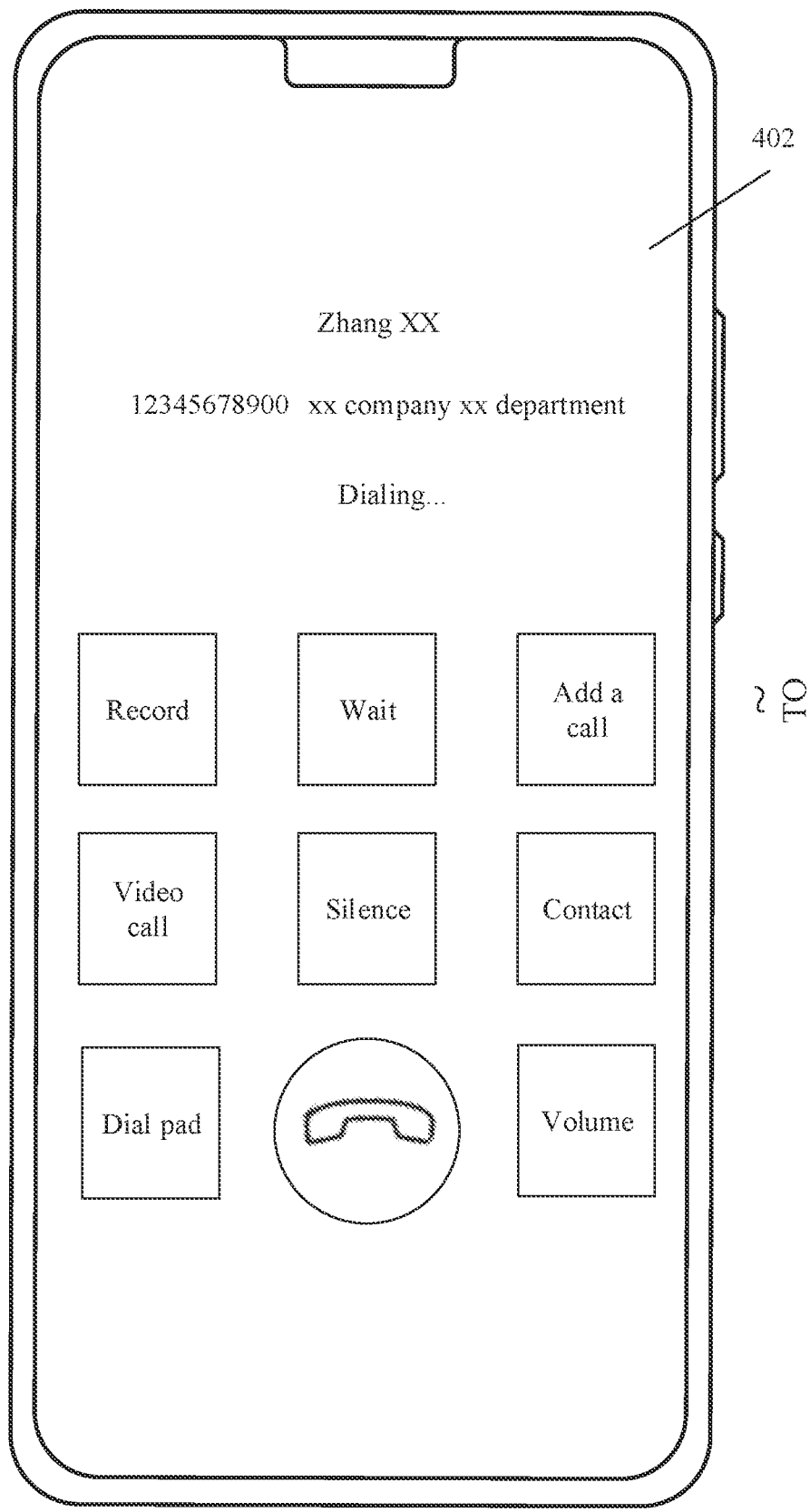
Figures 3, 4A:
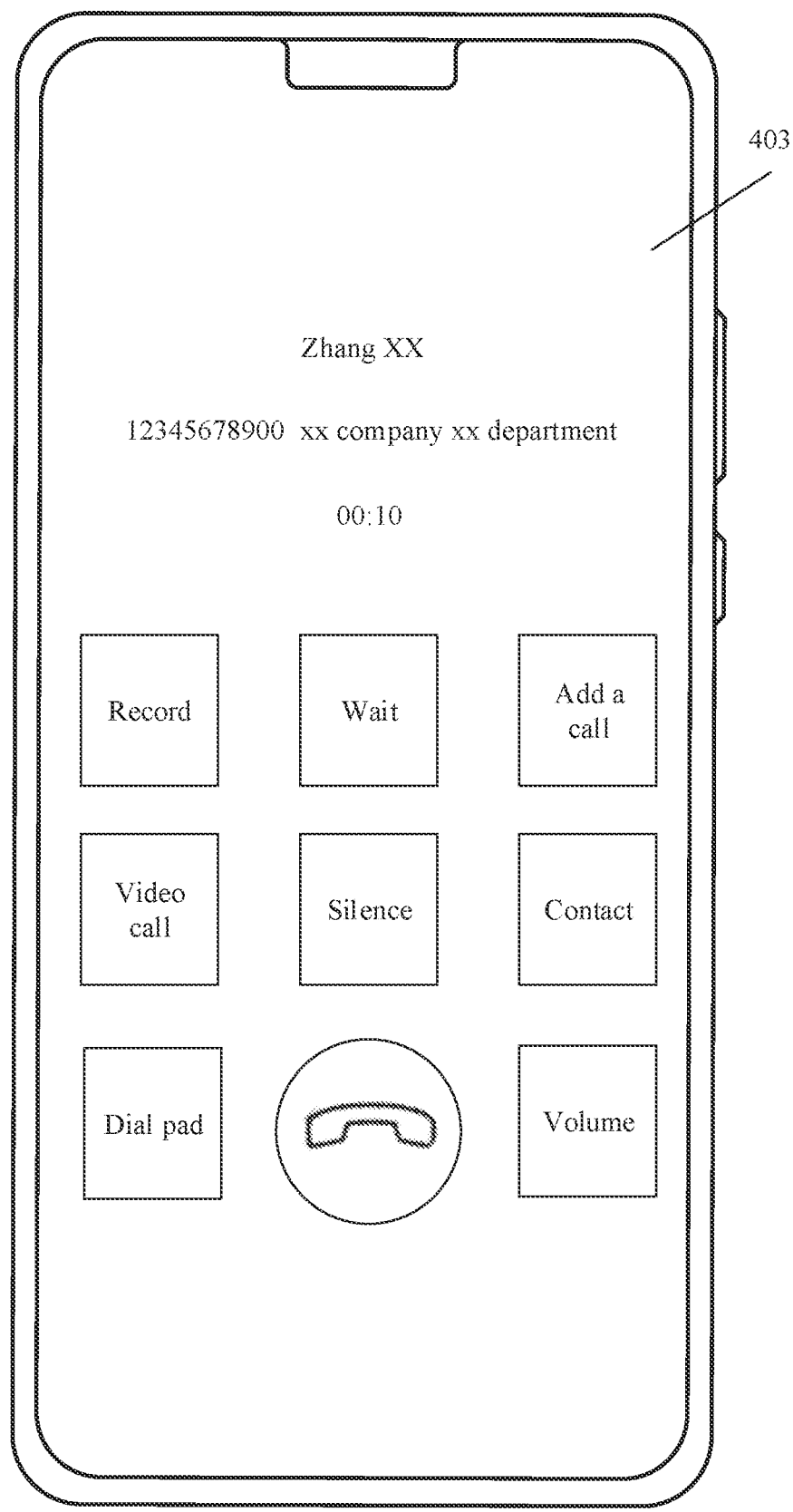

For example, it is assumed that first employee information of the phone number "12345678900" includes Zhang XX, xx company xx department, and the foregoing first employee information may be displayed in a call-related interface. For example, as shown in FIG. 4A-1 to FIG. 4A-3, an incoming call interface 401 may display not only the phone number "12345678900", but also the first employee information "Zhang XX, xx company xx department". An outgoing call interface 402 may not only display the phone number "12345678900", but also display the first employee information "Zhang XX, xx company xx department". Similarly, an in-call interface 403 may not only display the phone number "12345678900", but also display the first employee information "Zhang XX, xx company xx department".

Figure 4B:
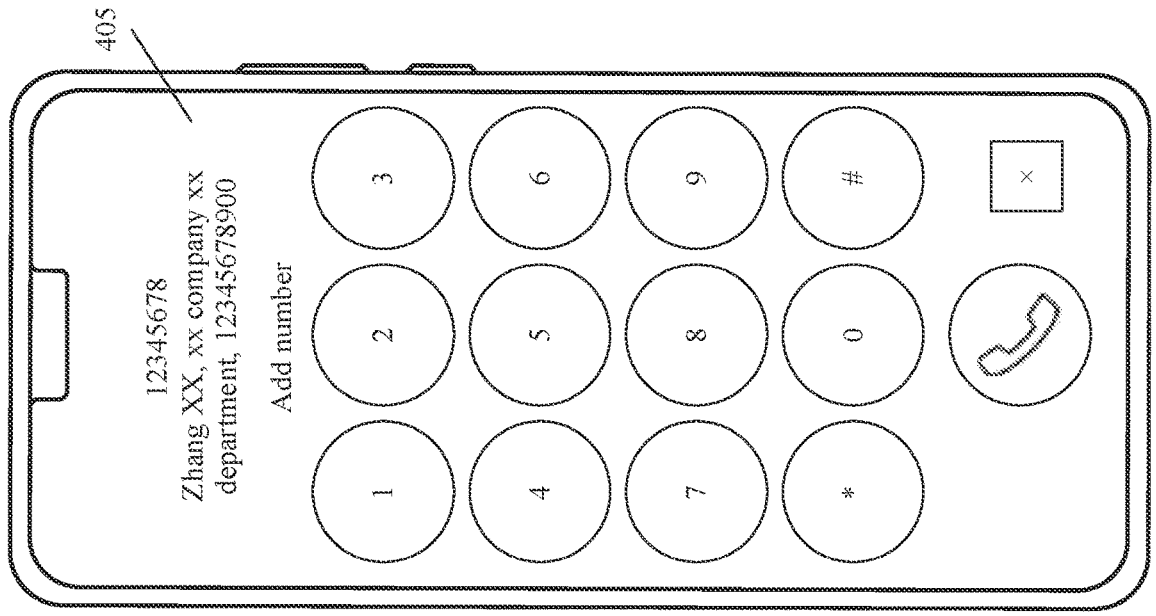
Figure 4B:
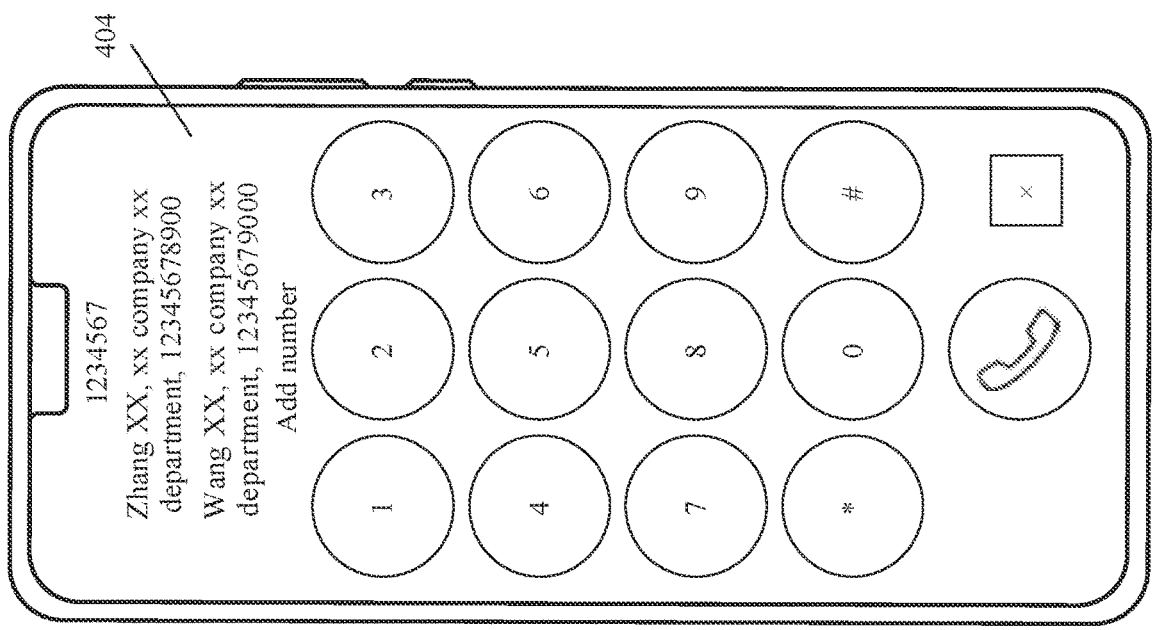

It should be noted that if the electronic device obtains a phone number entered by the user in the dialing interface in real time, and obtains first employee information corresponding to the phone number, the dialing interface may dynamically display the first employee information corresponding to the phone number entered by the user. For example, as shown in FIG. 4B, a phone number entered by the user in an interface 404 is "1234567", and first employee information corresponding to the phone number "1234567" displayed in the dialing interface is two pieces of employee information: "Zhang XX, xx company Xx department, 12345678900" and "Wang XX, xx company xx department, 12345679000" In an interface 405, a phone number entered by the user is "12345678", and first employee information corresponding to the phone number "12345678" displayed in the dialing interface is updated to one piece of employee information: "Zhang XX, xx company xx department, 12345678900".

Figure 4C:
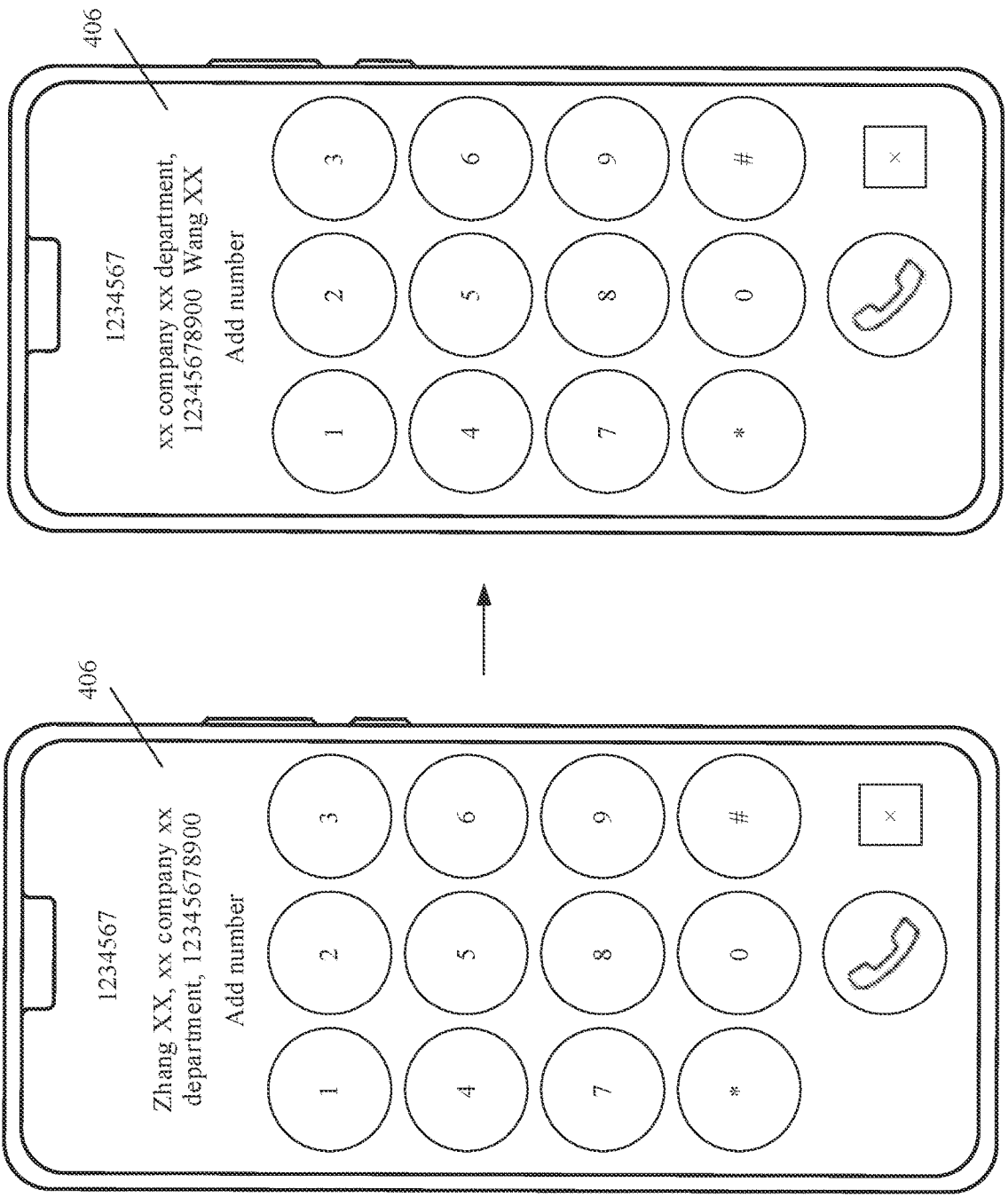

It should be noted that a manner of displaying the first employee information in the call-related interface is not limited in this embodiment of this application. If a display area set for user description information is relatively small, and all user description information cannot be displayed at the same time, the user description information may be sequentially displayed in a manner of scrolling and automatically page flipping. For example, in FIG. 4C, the two pieces of first employee information "Zhang XX, xx company xx department, 12345678900" and "Wang XX, xx company xx department, 12345679000" are scrolled from right to left in an incoming call interface 406.

It should be noted that, in addition to the first employee information, information sources of the first employee information may also be displayed in the call-related interface, that is, information of the foregoing communication application, such as a name of the communication application.

Through the foregoing processing, relatively more information about the user of the peer end of the call can be displayed in the call-related interface, thereby improving call experience of the user.

In the embodiment shown in FIG. 2A, a communication application is used as an information source to obtain employee information corresponding to a first phone number. In another embodiment of the interface display method of this application, another application or a server that stores a phone number and corresponding user information may also be used as an information source. For example, the communication application may be Welink®, DingTalk®, Lark®, or the like, a yellow page application, a blacklist application, a number marking application, an education application (APP) in an electronic device, or a server that records information corresponding to a phone number in a cloud. In this case, the communication application in the embodiment shown in FIG. 2A may be replaced with the foregoing information sources. Correspondingly, information obtained from the foregoing information sources may be displayed in a call-related interface. Specific descriptions are given below.

The yellow page application records merchant information and contact information of the merchant, such as a phone number. In this case, different from the method shown in FIG. 2A, merchant information corresponding to the first phone number may be obtained from the yellow page application, and the merchant information corresponding to the first phone number is displayed in the call-related interface of the first phone number. The merchant information may include a merchant name, an address, and the like, for example, "xx restaurant" and "xx Road xx number".

In the blacklist application, a phone number added by the user to a blacklist is recorded. In this case, different from the method shown in FIG. 2A, first information corresponding to the first phone number may be obtained from the blacklist application, where the first information is used to indicate whether the first phone number is recorded in the blacklist application, and the foregoing first information is displayed in the call-related interface of the first phone number. For example, "This number is a blacklist number" or "This number is not a blacklist number".

The number marking application is used to record a phone number with marking information, for example, a phone number is marked as "express call" or "sales call", or the like. In this case, different from the method shown in FIG. 2A, marking information corresponding to the first phone number may be obtained from the number marking application, and the marking information is displayed in the call-related interface of the first phone number.

The foregoing information source may also be a server in the cloud, and the server may record user description information corresponding to a phone number. For example, the foregoing user description information may be the foregoing employee information, the merchant information, the marking information, and the like.

In the foregoing embodiment, that the electronic device obtains, from an information source, the user description information corresponding to the first phone number is used as an example. In another embodiment of the interface display method in this application, the user description information corresponding to the first phone number may be obtained from at least two information sources. The foregoing information source may include but is not limited to an address book, a communication application, a blacklist application, a yellow page application, a marking data application, and a server that records user description information corresponding to a phone number of an electronic device.

When obtaining the user description information corresponding to the first phone number from a plurality of information sources, and the user description information is obtained from at least two information sources, the user description information of some or all information sources may be selected from the at least two information sources to be displayed in the call-related interface. For example, it is assumed that the plurality of information sources are a blacklist application, a yellow page application, a marking data application, and a communication application. If the user description information corresponding to the first phone number separately obtained from the yellow page application and the marking data application, the user description information obtained from the yellow page application and the marking data application may be displayed in the call-related interface, or user description information of an application may be selected from the yellow page application and the marking data application.

If the user description information of the part of the information sources is selected and displayed in the call-related interface, a priority of a plurality of information sources may be preset, and the part of information sources are selected based on the priority of the information source. For example, it is assumed that the plurality of information sources are a blacklist application, a yellow page application, a marking data application, and a communication application, and priorities are successively reduced. If user description information corresponding to the first phone number is separately obtained from the yellow page application and the marking data application, user description information of the yellow page application with a higher priority is selected based on the foregoing priority sequence, and displayed in the call-related interface.

It should be noted that when user description information of a plurality of information sources is displayed in the call-related interface, a specific display manner is not limited in this embodiment of this application. For example, user description information of different information sources may be displayed in different specified areas in the call-related interface based on a specified sequence. The foregoing specified sequence may be a preset priority sequence of the information sources, a time sequence of obtaining the user description information from the information sources, or the like. For example, referring to FIG. 4C, as shown in the incoming call interface 401, user description information of a highest-priority information source may be displayed at a main location of the call-related interface, and user description information of another information source may be displayed at a secondary location of the call-related interface. For another example, if a display area of the user description information cannot completely display all user description information, user description information of each information source in a plurality of information sources may be successively displayed in a manner of scrolling, automatically page flipping, or the like. A display sequence of the user description information of the plurality of information sources is not limited in this embodiment of this application. For example, the user description information of the plurality of information sources may be sequentially displayed based on a preset priority sequence of the information sources or a time sequence of obtaining the user description information from the information sources.

In another interface display method provided in this embodiment of this application, user description information corresponding to a first phone number may be successively obtained from a plurality of information sources based on a preset obtaining sequence. If the user description information corresponding to the first phone number is obtained from an information source, a process of obtaining the user description information corresponding to the first phone number ends. The obtained user description information is displayed in a call-related interface. In the following embodiment shown in FIG. 5A, an example in which contact information is first obtained from an address book of an electronic device, and the contact information is not obtained before employee information is obtained from a communication application is used.

Figure 5A:
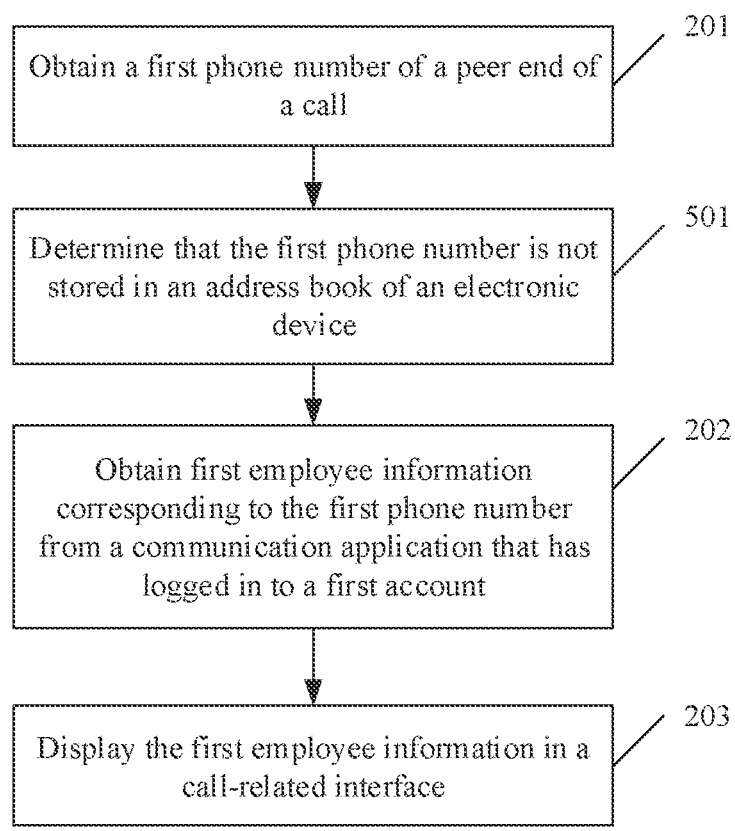
FIG. 5A is a flowchart of another embodiment of an interface display method according to this application.

Different from the foregoing method shown in FIG. 2A, in the interface display method shown in FIG. 5A, employee information corresponding to the first phone number is obtained from the communication application only when the phone number is a strange number. As shown in FIG. 5A, step 501 is further included between step 201 and step 202. Specifically, Step 501: Determine that a first phone number is not stored in an address book of an electronic device.

In an electronic device such as a mobile phone, an address book is generally disposed. A contact information, such as a name and a phone number, is recorded in the address book. If a phone number of a peer end of a call has been stored in the address book, it indicates that a user has a specific knowledge about the user of the peer end of the call. In this case, employee information may not be obtained from the communication application, only name information corresponding to the first phone number is found from a local address book of the electronic device, and the name information is displayed in a call-related interface, so that a data processing amount of the electronic device may be reduced compared with the method shown in FIG. 2A. If the phone number of the peer end of the call is not stored in the address book, it indicates that the phone number of the peer end of the call is very strange to the user, and the user cannot directly learn user information of the opposite end of the call from the phone number. In this case, the employee information is obtained from the communication application and displayed in the call-related interface, so that relatively more information of the peer end of the call may be provided to ensure user experience. Therefore, in the method shown in FIG. 5A, in a case in which user experience is ensured, a data processing amount of an electronic device may be relatively reduced.

In another embodiment provided in the interface display method of this application, the user description information obtained from the information source may be stored in a call record of the first phone number. Therefore, the user may also query the first employee information when querying the call record of the first phone number.

It should be noted that if the user description information corresponding to the first phone number is obtained from a plurality of information sources, the user description information obtained from some or all of the plurality of information sources may be stored in the call record of the first phone number. Optionally, the call record may record an information source to which each piece of user description information belongs and a jump path of the information source. It should be noted that the jump path of the information source herein may be an access path of a specified interface in the information source, for example, a view interface of the user description information in the information source, so as to jump to the view interface, or the jump path may be an access path of the information source. If the user description information obtained from some information sources in the plurality of information sources is stored in the call record of the first phone number, that the user description information obtained from which information sources is specifically stored is not limited in this embodiment of this application, for example, the user description information may be preset, and the electronic device selects the user description information based on a preset priority of the information source. For example, it is assumed that the employee information corresponding to the first phone number obtained from a communication application 1 based on the first phone number is "Zhang xx, xx company xx department", contact information corresponding to the first phone number obtained from a communication application 2 is "Li xx's Mother, xx English extracurricular class group", and contact information corresponding to the first phone number obtained from a local address book is "Zhang xx, xx Class Li xx's Mother". In this case, the call record of the first phone number may record the following information: the communication application 1, an access path of the communication application 1, "Zhang xx, xx company xx department"; the communication application 2, access path of the communication application 2, "Li xx's Mother, xx English extracurricular class group"; and the local address book, access path of local address book, "Zhang XX, XX Class Li xx's Mother".

Figure 5B:
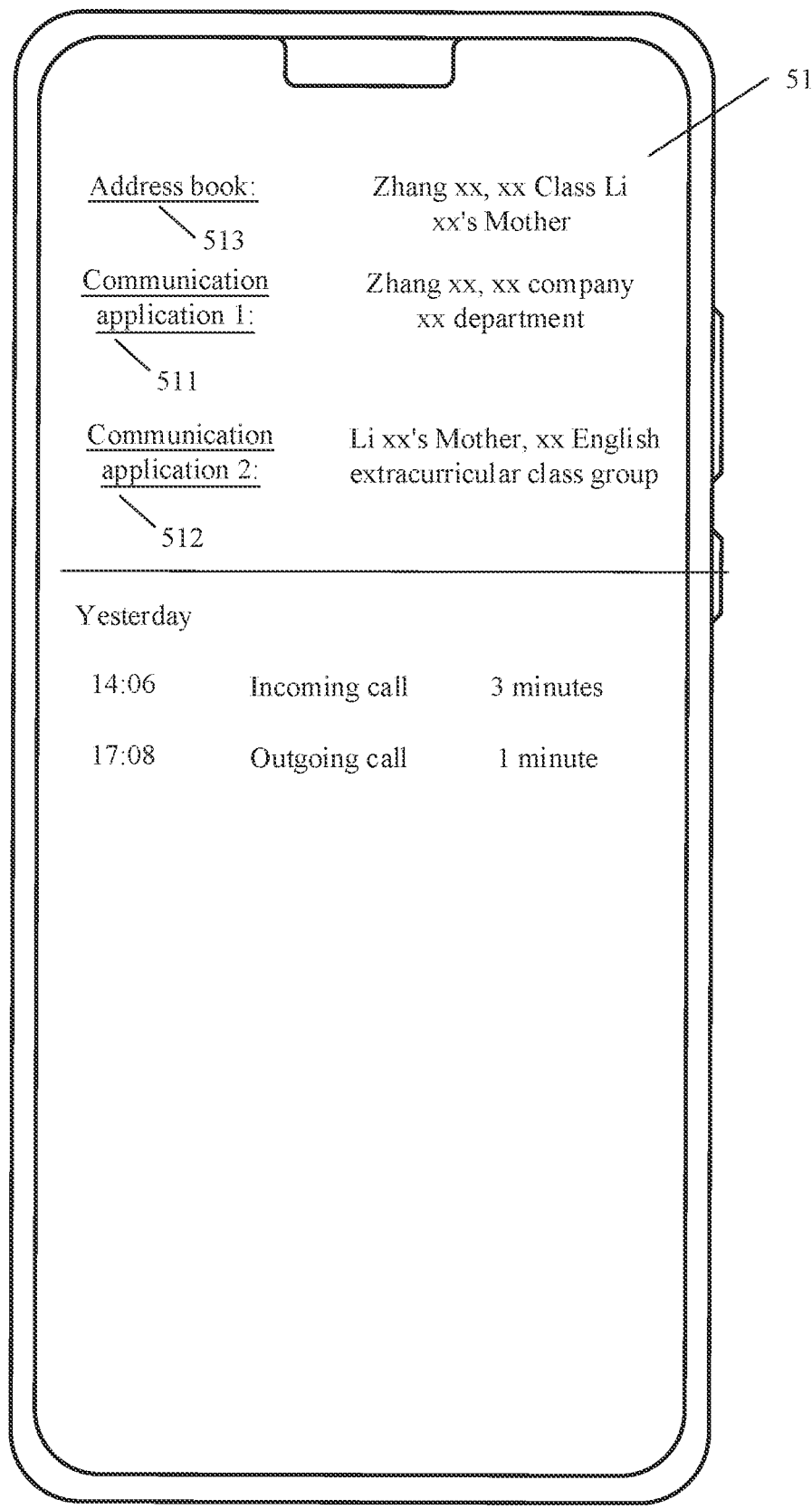
FIG. 5B is a schematic diagram of a call detail interface of a call record according to an embodiment of this application.
Figure 6A:
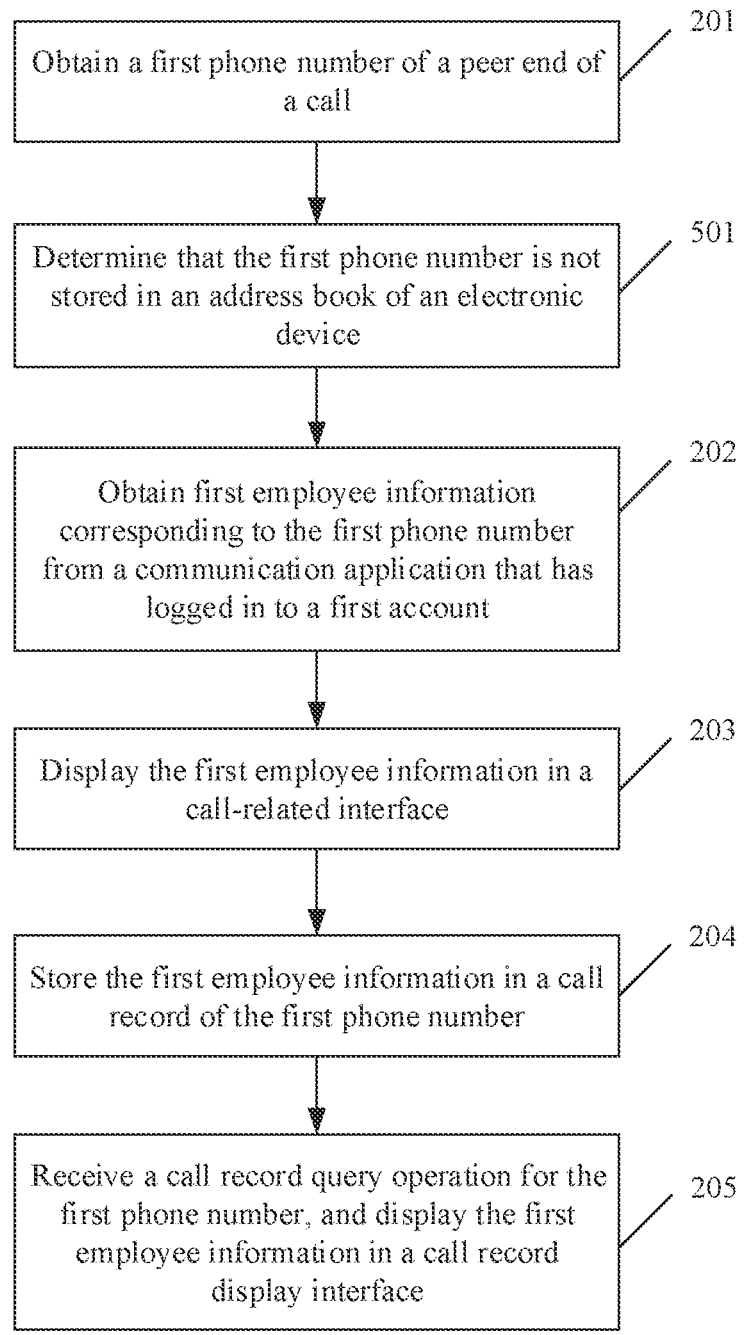
FIG. 6A is a flowchart of another embodiment of an interface display method according to this application.

If the call record of the first phone number stores user description information obtained from a plurality of information sources, when the user views call record details of the first phone number, the user description information of some or all of the stored information sources in the plurality of information sources may be displayed in a call record display interface, or the information source to which the user description information belongs and the jump link of the information source may be displayed. The jump link is used to jump to a corresponding information source. For example, if the information source is an application, the jump link may be used to enable the application, and if the information source is a cloud server, the jump link may be used to open access page of the cloud server. If the user description information of the part of the information source is displayed, the user description information obtained from which information source is specifically displayed is not limited in this embodiment of this application, for example, may be preset by the user, and the electronic device independently selects based on a preset priority of the information source. Referring to FIG. 5B, an interface 51 is a schematic diagram of a call detail interface of the call record of the first phone number in the foregoing example. All three pieces of user description information are displayed as an example. The interface 51 displays: the foregoing three pieces of user description information "Zhang xx, xx company xx department", "Li xx's Mother, XX English extracurricular class group", "Zhang xx, xx Class Li xx's Mother", and corresponding information sources "communication application 1", "communication application 2", and "address book". Each information source sets corresponding jump controls 511 to 513. The jump control 511 is used to jump to the communication application 1 when being selected, the jump control 512 is used to jump to the communication application 2 when being selected, and the jump control 513 is used to jump to the address book when being selected The following continues the embodiment shown in FIG. 5A by using an example in which the first employee information corresponding to the first phone number is stored in the call record of the first phone number. Referring to FIG. 6A, step 204 and step 205 are added after step 203 in FIG. 5A. Compared with the embodiment shown in FIG. 5A, the method may further include:

Step 204: Store the first employee information in a call record of the first phone number.

Step 205: Receive a call record query operation for the first phone number, and display the first employee information in a call record display interface.

Figure 6B:
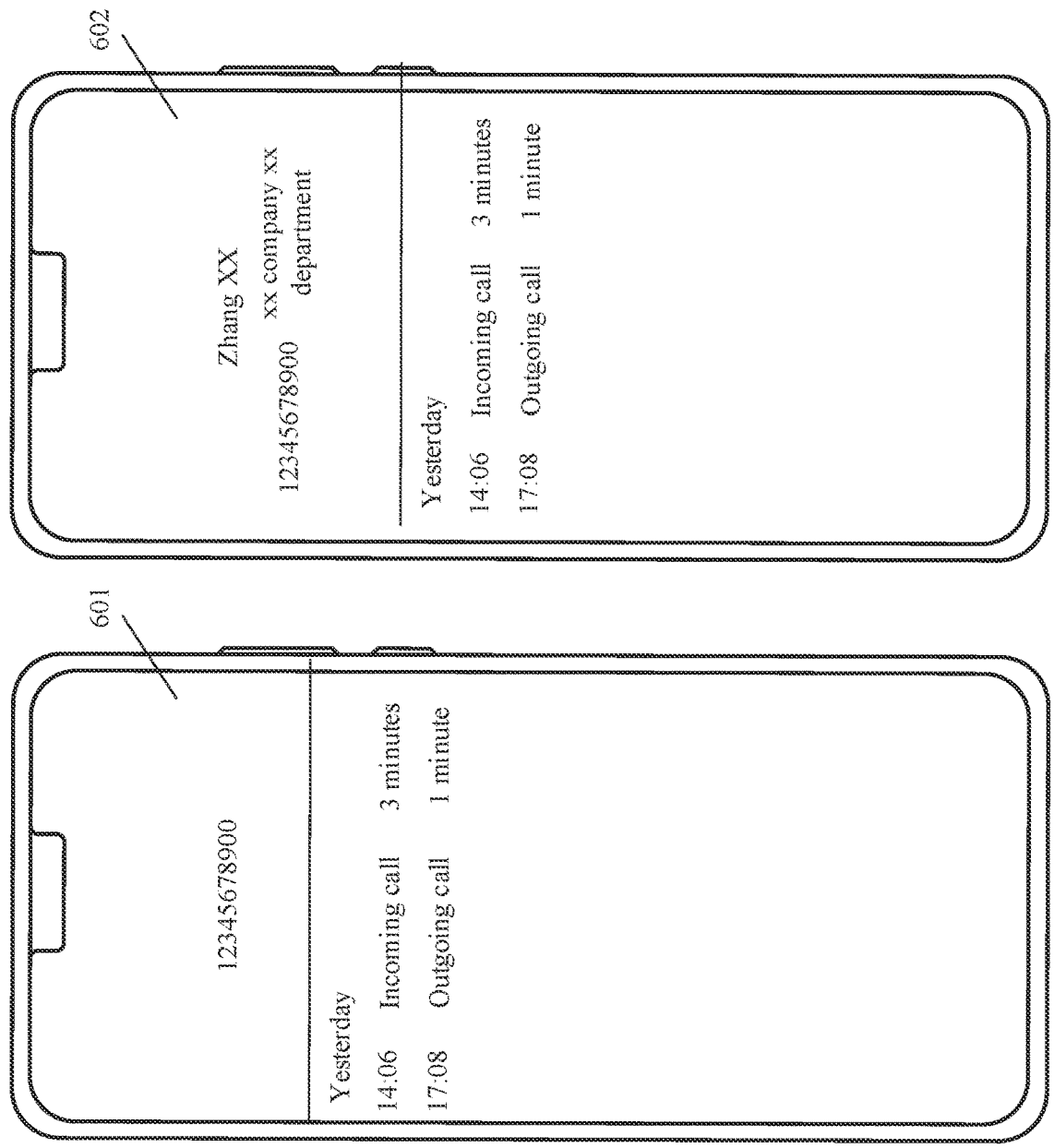
FIG. 6B is a diagram of an example of a call record detail interface according to this application.

For example, the call record display interface is shown in FIG. 6B. In the prior art, for a call record display interface, refer to an interface 601, and only the first phone number, talk time information, and the like are displayed. The call record display interface provided by the interface display method of this application further displays the first employee information, so that the user can learn the first employee information after a call ends, which provides the user with relatively more information about the user of the peer end of the call, and further improves user experience.

Figure 7:
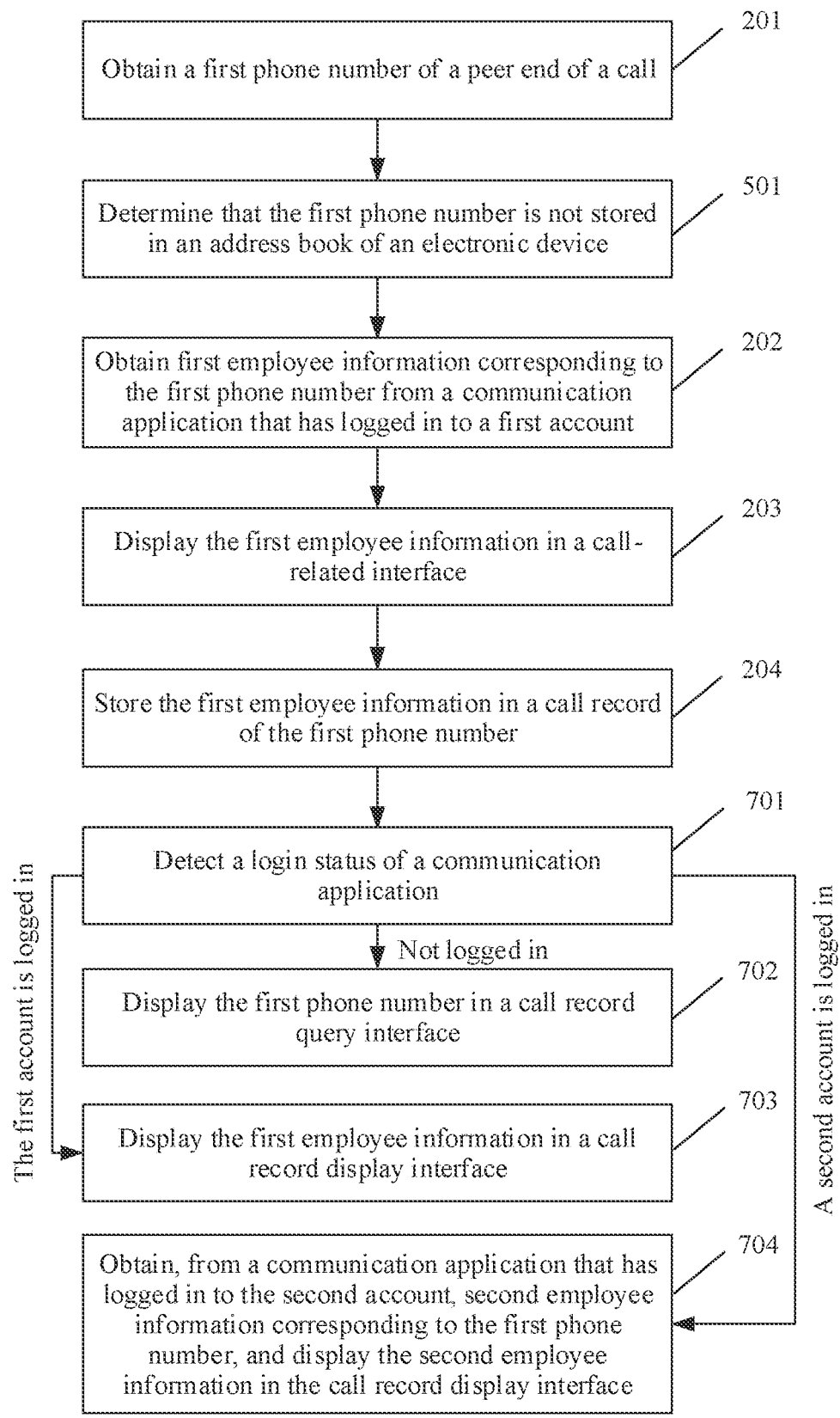
FIG. 7 is a flowchart of another embodiment of an interface display method according to this application.

Different from the foregoing method shown in FIG. 6A, to ensure security and privacy of enterprise employee information, in the method shown in FIG. 7, step 205 is further replaced with the following step 701 to step 704. Specifically, Step 701: If a call record query operation for a first phone number is received, detect a login status of a communication application, and if the communication application is not logged in, perform step 702: if a first account is logged in, perform step 703: or if a second account is logged in, perform step 704.

Step 702: Display the first phone number in a call record query interface. This branching procedure ends.

Because the communication application is not logged in, in this case, the first employee information may not be displayed in the call record query interface, so as to prevent disclosure of the enterprise employee information. A call record display interface is, for example, shown in an interface 601 in FIG. 6B.

In another possible implementation, if the communication application is not logged in, first employee information that has been stored in call record may also be displayed in the call record query interface.

Optionally, in a state in which the communication application is not logged in, displaying the first employee information or not displaying the first employee information in the call record query interface may also be set by a user in an electronic device, or a default setting in the electronic device is used. In this case, if it is detected in step 701 that the login status of the communication application is not logged in, setting information of whether to display the first employee information in the electronic device may be obtained. If the setting information is displaying, the first employee information is displayed in the call record query interface; or if the setting information is not displaying, the first phone number is displayed in the call record query interface, and the first employee information is not displayed.

Step 703: Display the first employee information in a call record display interface. This branching procedure ends.

Step 704: Obtain, from the communication application that has logged in to a second account, second employee information corresponding to the first phone number, and display the second employee information in the call record display interface.

Because the communication application logs in to the second account, the communication application may query, from a remote server, employee information of an enterprise associated with the second account, and may store the employee information of the enterprise associated with the second account in the electronic device. In this case, the communication application may search for the employee information corresponding to the first phone number from the employee information of the enterprise associated with the second account.

In the method shown in FIG. 7, different information is displayed in the call record display interface based on whether the communication application has logged in to an account and a login account, thereby ensuring security and privacy of the enterprise employee information, and improving user experience.

Figure 8:
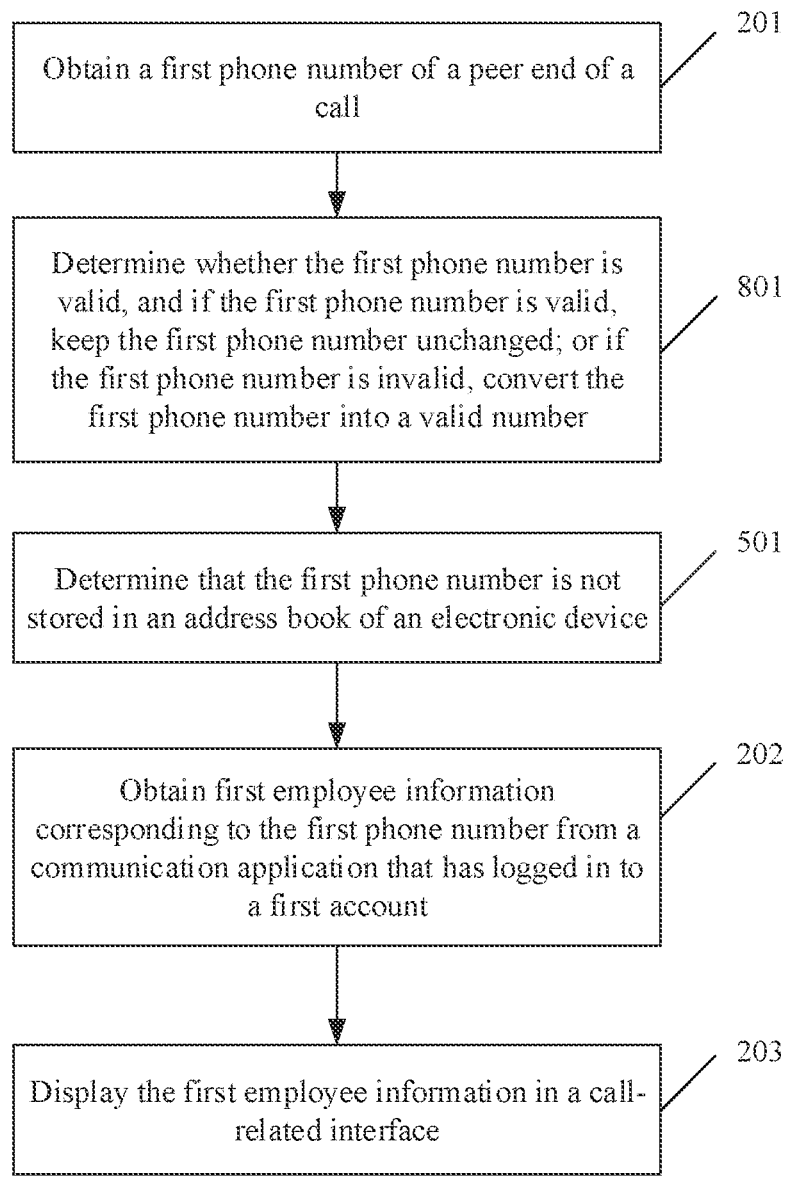
FIG. 8 is a flowchart of another embodiment of an interface display method according to this application.

To prevent failure of querying a contact from a local address book or obtaining employee information from a communication application due to an invalid first phone number, in the interface display method in this embodiment of this application, validity of the first phone number may be further determined, and an invalid first phone number is converted into a valid number. For example, determining validity of the first phone number is added in the embodiment shown in FIG. 5A. As shown in FIG. 8, step 201 and step 501 may further include the following step 801:

Step 801: Determine whether the first phone number is valid, and if the first phone number is valid, keep the first phone number unchanged; or if the first phone number is invalid, convert the first phone number into a valid number.

Determination on validity of the first phone number may be determination on a phone number format. For example, if there is a "+86" in a mobile phone number or there is a non-numeric character such as ".", "," in the phone number, it may be determined that the phone number is invalid. For example, if the first phone number is "+86 12345678900", in this step, it may be determined that the first phone number is invalid, and the first phone number may be converted into a valid number "12345678900".

A method for converting the first phone number into a valid number may include: performing validity detection and/or formatting processing on the first phone number. For specific implementation of the validity detection and formatting processing of the phone number, refer to corresponding description in step 203. Details are not described herein again.

It should be noted that, validity of the first phone number may not be determined. Regardless of whether the first phone number is valid, a step of converting the first phone number into a valid number is directly performed.

Figure 9:
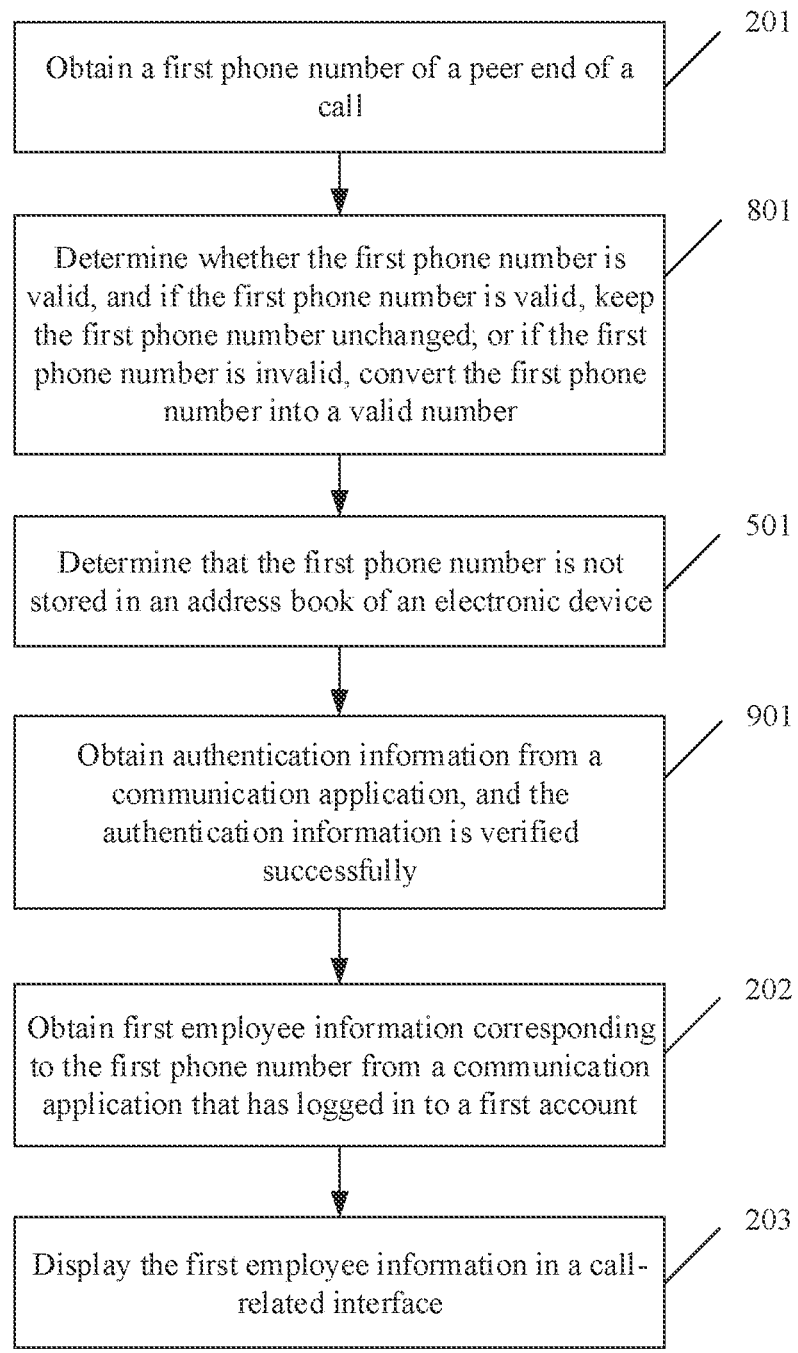
FIG. 9 is a flowchart of another embodiment of an interface display method according to this application.

To further ensure security of obtaining information from the communication application, before obtaining the employee information corresponding to the first phone number from the communication application, authentication processing may be performed on the communication application. An example in which authentication processing is added to the embodiment shown in FIG. 8 is used. As shown in FIG. 9, step 501 and step 202 may further include the following step 901:

Step 901: Obtain authentication information from a communication application, and the authentication information is verified successfully.

Specifically, each application has a unique packet name and a unique signature, and the foregoing authentication information may be a packet name and/or a signature of the communication application. The foregoing verification on the authentication information may be implemented by means of verification on the packet name and the signature of the communication application.

It should be noted that the communication application may also perform authentication on an application that interacts with the communication application in the electronic device, and an authentication method is not limited in this embodiment of this application. For example, reference may be made to the method for performing authentication on the communication application in step 901.

It should be noted that in the foregoing another embodiment, for example, in the embodiments shown in FIG. 2A, FIG. 6A, and FIG. 7, step 801 and/or step 901 may also be added. Details are not described in this embodiment of this application.

Figure 10:
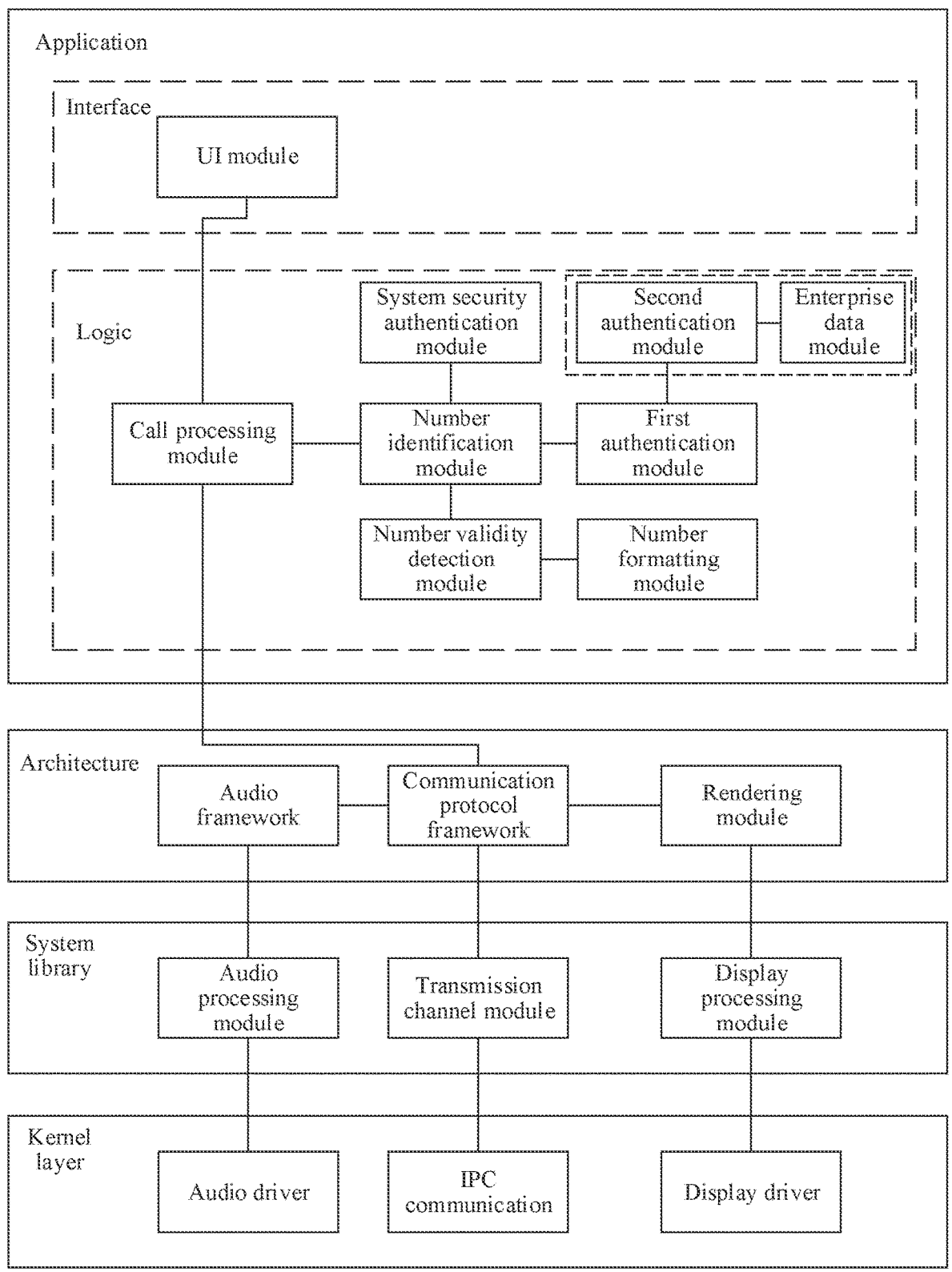
FIG. 10 is a block diagram of a software structure of an electronic device according to this application.

FIG. 10 is a block diagram of a software structure of an electronic device according to an embodiment of this application. Layered architecture divides software into several layers and each layer has a clear role and division of labor. Layers communicate with each other by using software interfaces. In some embodiments, an Android® system is divided into four layers, which are, from top to bottom, an application layer, a framework layer, an Android® runtime, a system library, and a kernel layer.

The application layer (App) may include a series of application packages. As shown in FIG. 10, the application package may include a call service application, an address book application, and the like. In addition, the application layer can be divided into three modules: interface, logic and data. Modules communicate with each other by using software interfaces. The interface module is configured to display information for user interaction, the logic module is configured to process information, and the data module is configured to store data.

Specifically, as shown in FIG. 10, the interface module includes: a UI module, configured to display a call-related interface, such as the foregoing incoming call interface, the outgoing call interface, the in-call interface, and the dialing interface.

The logic module includes a call processing module, a system authentication module, a number identification module, a number validity detection module, a number formatting module, a first authentication module, a second authentication module, and an enterprise data module.

The call processing module is configured to obtain a first phone number of a peer end of a call, send the first phone number to the number identification module, and send first employee information fed back by the number identification module to the UI module, so as to display the first employee information in a call-related interface.

The system authentication module is configured to perform authentication on an application that accesses the number identification module, and perform authentication on an application that reads contact information by invoking the number identification module. Optionally, the system authentication module may store a first whitelist and a second whitelist. The first whitelist stores authentication information of an application that can access the number identification module, and the second whitelist stores authentication information of an application that can invoke the number identification module to read contact information. Authentication information of an application may include a packet number and a signature of the application. When another application accesses the number identification module, it may be determined, based on a packet number and a signature of the application, whether the application is recorded in the first whitelist.

If yes, authentication on the application succeeds; otherwise, authentication on the application fails. Similarly, when another application invokes the number identification module to read the contact information, it may be determined, based on a packet number and a signature of the application, whether the application is recorded in the second whitelist. If yes, authentication on the application succeeds; otherwise, authentication on the application fails.

The number identification module is configured to interact with the call processing module, the first authentication module, the enterprise data module, the number validity detection module, and the like to obtain the first employee information of the first phone number, and feed back the first employee information to the call processing module.

The number validity detection module is configured to detect validity of a phone number.

The number formatting module is configured to convert an invalid phone number into a valid number.

The first authentication module is configured to cooperate with the number identification module to perform authentication on the communication application.

The second authentication module is an authentication module of the communication application, and is configured to perform authentication on another application that performs data interaction with the communication application.

For an interaction process between the first authentication module and the second authentication module, refer to FIG. 2B. Details are not described herein again.

The enterprise data module is configured to store employee information of an enterprise associated with a logged-in account in the communication application.

The second authentication module and the enterprise data module may be modules in the communication application.

A Framework (FWK) provides an application programming interface (API) and a programming framework for an application of the application layer. An application framework layer includes some predefined functions. As shown in FIG. 10, the framework layer includes a communication protocol framework. The communication protocol framework is configured to transmit call data. The frame layer may further include an audio framework, a rendering module, and the like.

The system library may include a plurality of function modules. For example, the audio processing module, a transmission channel module, and a display processing module shown in FIG. 10.

The kernel layer is a layer between hardware and software. The kernel layer may include a display driver, IPC communication, an audio driver, and the like.

Figure 11:
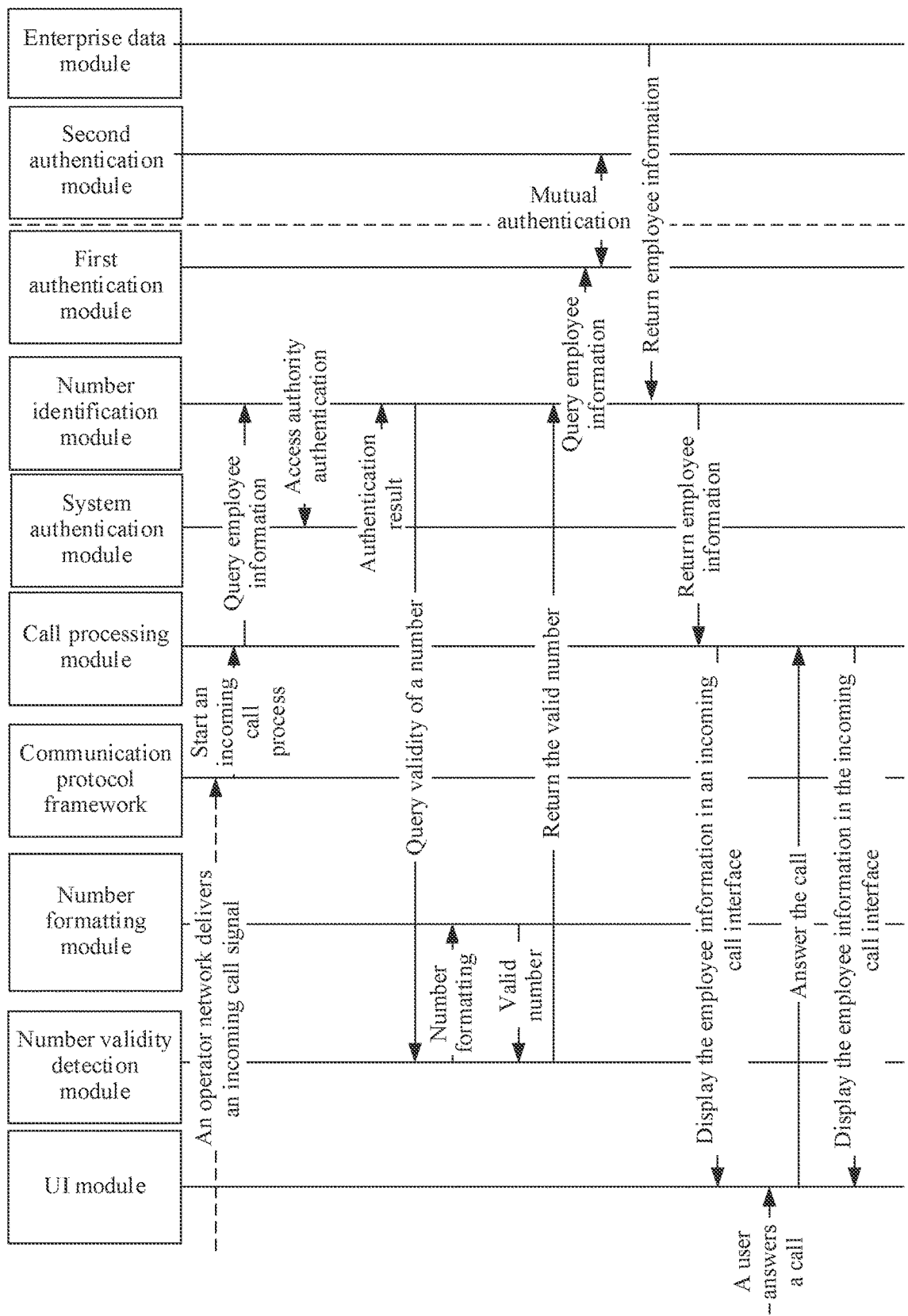
FIG. 11 is a flowchart of an interface display method based on the software structure of the electronic device shown in FIG. 10 according to an embodiment of this application.

FIG. 11 is an interface display method based on a software structure of the foregoing electronic device according to an embodiment of this application. As shown in FIG. 11, the method may be used to implement the interface display method shown in FIG. 2A in an incoming call scenario. Specifically, the communication protocol framework and the call processing module are configured to implement step 201. The call processing module, the number identification module, and the enterprise data module are configured to implement step 202. The number identification module, the call processing module, and the UI module are configured to implement step 203, so as to display an incoming call interface. Further, after the user answers an incoming call in the incoming call interface, the UI module is configured to display an in-call interface in step 203. Further, in a process of performing step 202, a permission authentication step for another application to access the number identification module is further added, which is implemented by the number identification module and the system authentication module. Further, in the process of performing step 202, a number validity detection step and a formatting processing step are further added, where the number validity detection is implemented by using the number identification module and the number validity detection module, and the formatting processing step is implemented by using the number validity detection module and the number formatting module. Further, in the process of performing step 202, a mutual authentication step between an application to which the number identification module belongs and a communication application to which the enterprise data module belongs is further added, and is implemented by using the number identification module, the first authentication module, the second authentication module, and the enterprise data module.

Figure 12:
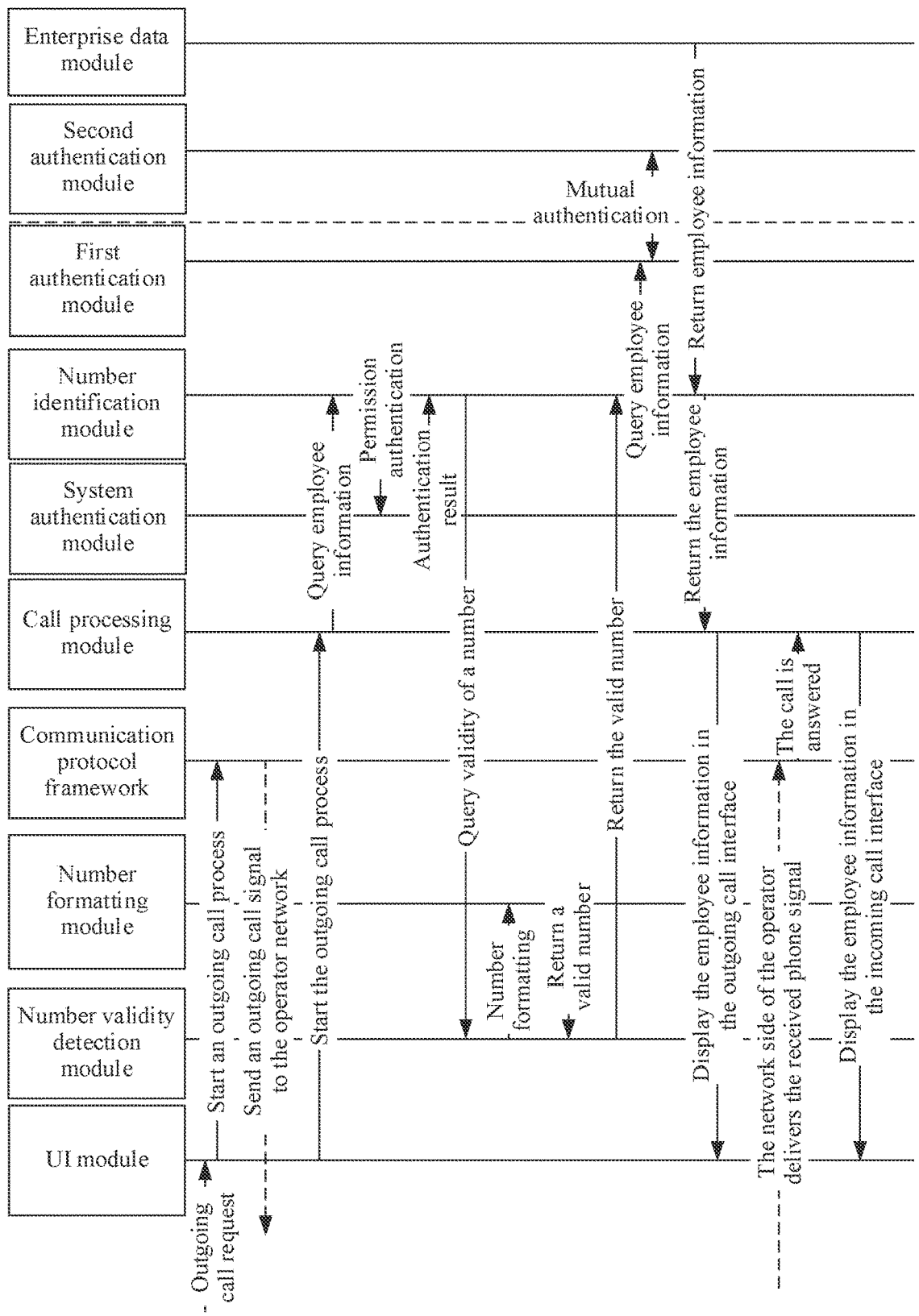
FIG. 12 is a flowchart of an interface display method based on the software structure of the electronic device shown in FIG. 10 according to an embodiment of this application.

FIG. 12 is an interface display method based on a software structure of the foregoing electronic device according to an embodiment of this application. As shown in FIG. 12, the method may be used to implement the interface display method shown in FIG. 2A in an outgoing call scenario. Specifically, the UI module and the call processing module are configured to implement step 201. The call processing module, the number identification module, and the enterprise data module are configured to implement step 202. The number identification module, the call processing module, and the UI module are configured to implement step 203, so as to display an outgoing call interface. Further, the electronic device receives an outgoing call connected signal delivered by the network side of the operator, and the UI module, the communication protocol framework, and the call processing module are configured to display the in-call interface in step 203. Further, in the process of performing step 202, a permission authentication step for another application to access number identification module is further added, which is implemented by the number identification module and the system authentication module. Further, in the process of performing step 202, a number validity detection step and a formatting processing step are further added, where the number validity detection is implemented by using the number identification module and the number validity detection module, and the formatting processing step is implemented by using the number validity detection module and the number formatting module. Further, in the process of performing step 202, a mutual authentication step between an application to which the number identification module belongs and a communication application to which the enterprise data module belongs is further added, and is implemented by using the number identification module, the first authentication module, the second authentication module, and the enterprise data module.

Figure 13:
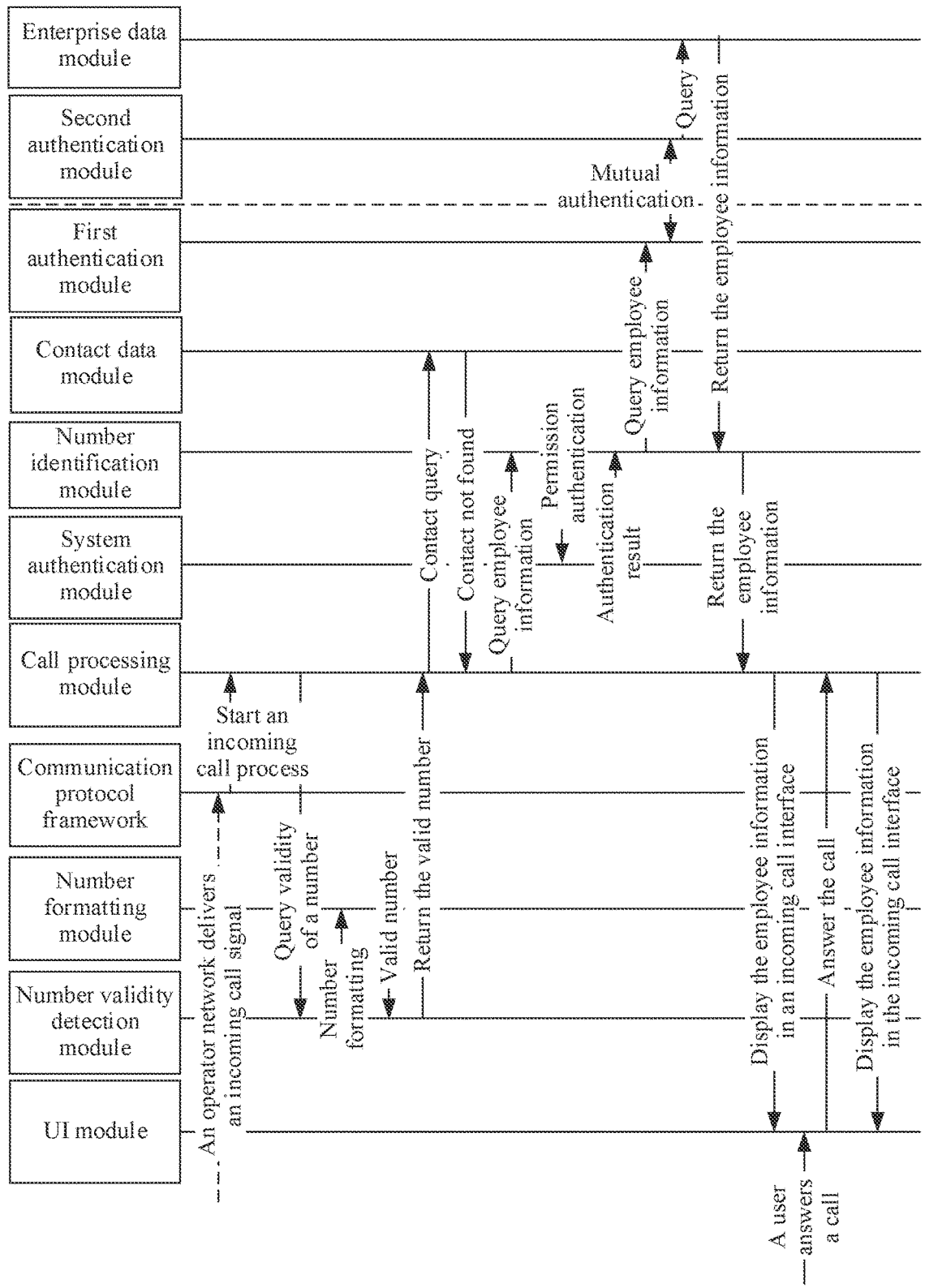
FIG. 13 is a flowchart of an interface display method based on the software structure of the electronic device shown in FIG. 10 according to an embodiment of this application.

FIG. 13 is an interface display method based on a software structure of the foregoing electronic device according to an embodiment of this application. As shown in FIG. 13, the method may be used to implement the interface display method shown in FIG. 5A in an incoming call scenario. Specifically, the communication protocol framework and the call processing module are configured to implement step 201. The call processing module and the contact data module are configured to implement step 501. The call processing module, the number identification module, and the enterprise data module are configured to implement step 202. The number identification module, the call processing module, and the UI module are configured to implement step 203, so as to display an incoming call interface. Further, after the user answers the incoming call in the incoming call interface, the UI module and the call processing module are configured to display the in-call interface in step 203. Further, in step 501, a number validity detection step and a formatting processing step are further added, where the number validity detection is implemented by using the number identification module and the number validity detection module, and the formatting processing step is implemented by using the number validity detection module and the number formatting module. Further, in the process of performing step 202, a permission authentication step for another application to access number identification module is further added, which is implemented by the number identification module and the system authentication module. Further, in the process of performing step 202, a mutual authentication step between an application to which the number identification module belongs and a communication application to which the enterprise data module belongs is further added, and is implemented by using the number identification module, the first authentication module, the second authentication module, and the enterprise data module.

Figure 14:
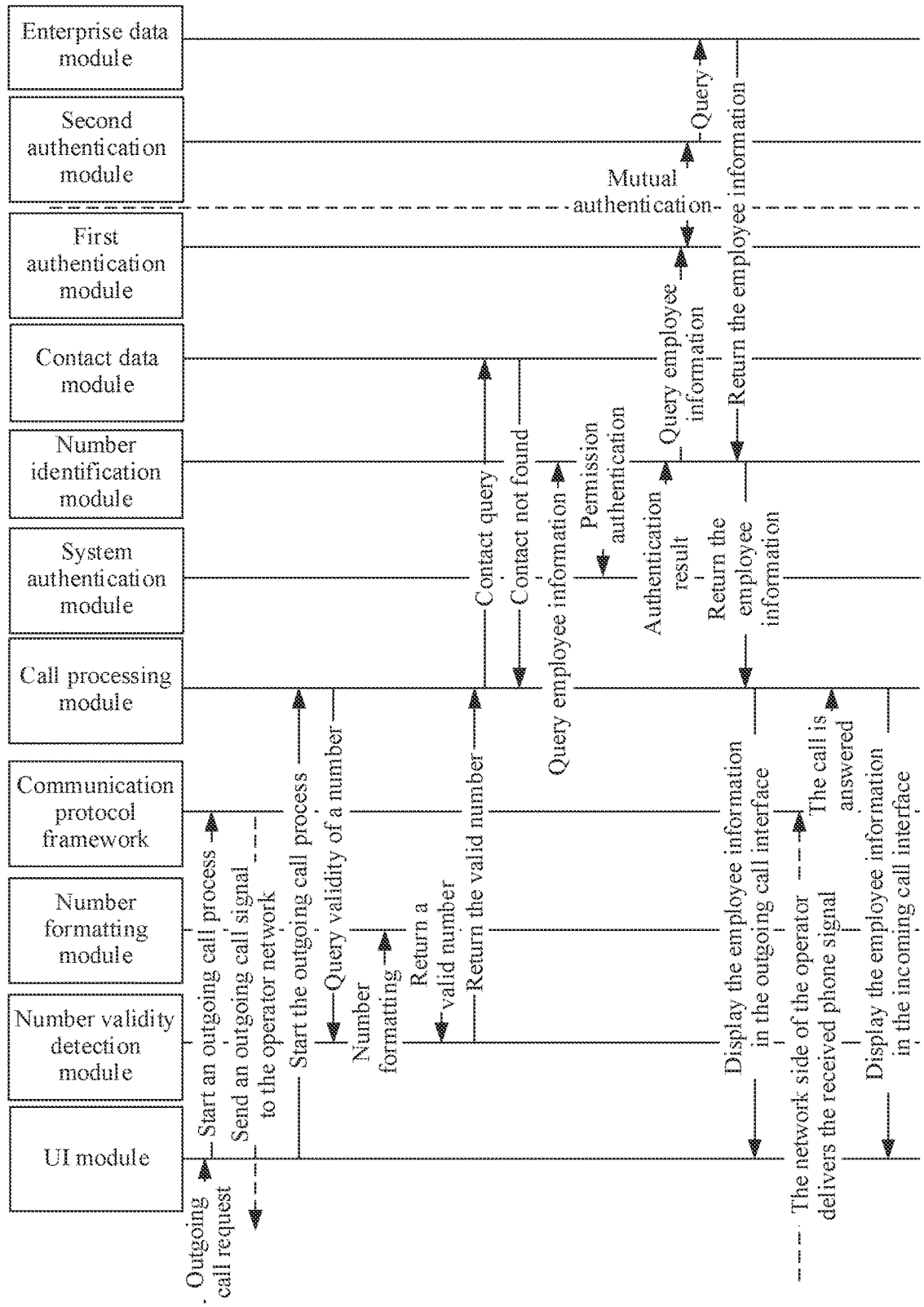
FIG. 14 is a flowchart of an interface display method based on the software structure of the electronic device shown in FIG. 10 according to an embodiment of this application.

FIG. 14 is an interface display method based on a software structure of the foregoing electronic device according to an embodiment of this application. As shown in FIG. 14, the method may be used to implement the interface display method shown in FIG. 2A in an outgoing call scenario. Specifically, the UI module and the call processing module are configured to implement step 201. The call processing module and the contact data module are configured to implement step 501. The call processing module, the number identification module, and the enterprise data module are configured to implement step 202. The number identification module, the call processing module, and the UI module are configured to implement step 203, so as to display an outgoing call interface. Further, the electronic device receives an outgoing call connected signal delivered by the network side of the operator, and the UI module, the communication protocol framework, and the call processing module are configured to display the in-call interface in step 203. Further, in step 501, a number validity detection step and a formatting processing step are further added, where the number validity detection is implemented by using the number identification module and the number validity detection module, and the formatting processing step is implemented by using the number validity detection module and the number formatting module. Further, in the process of performing step 202, a permission authentication step for another application to access number identification module is further added, which is implemented by the number identification module and the system authentication module. Further, in the process of performing step 202, a mutual authentication step between an application to which the number identification module belongs and a communication application to which the enterprise data module belongs is further added, and is implemented by using the number identification module, the first authentication module, the second authentication module, and the enterprise data module.

In the foregoing FIG. 10, that the first data source is a communication application is used as an example. If the first data source is a yellow page application, a blacklist application, a number marking application, or the like, in a software implementation structure of the electronic device, a data module of the foregoing application may be used to replace the enterprise data module in FIG. 10. For a specific implementation procedure, refer to the foregoing FIG. 11 to FIG. 14. It should be noted that if an application used as the first data source belongs to a system application, when the application to which the number identification module belongs accesses the data module of the foregoing application, inter-application authentication may not be performed, that is, the first authentication module and the second authentication module need not be disposed.

Figure 15:
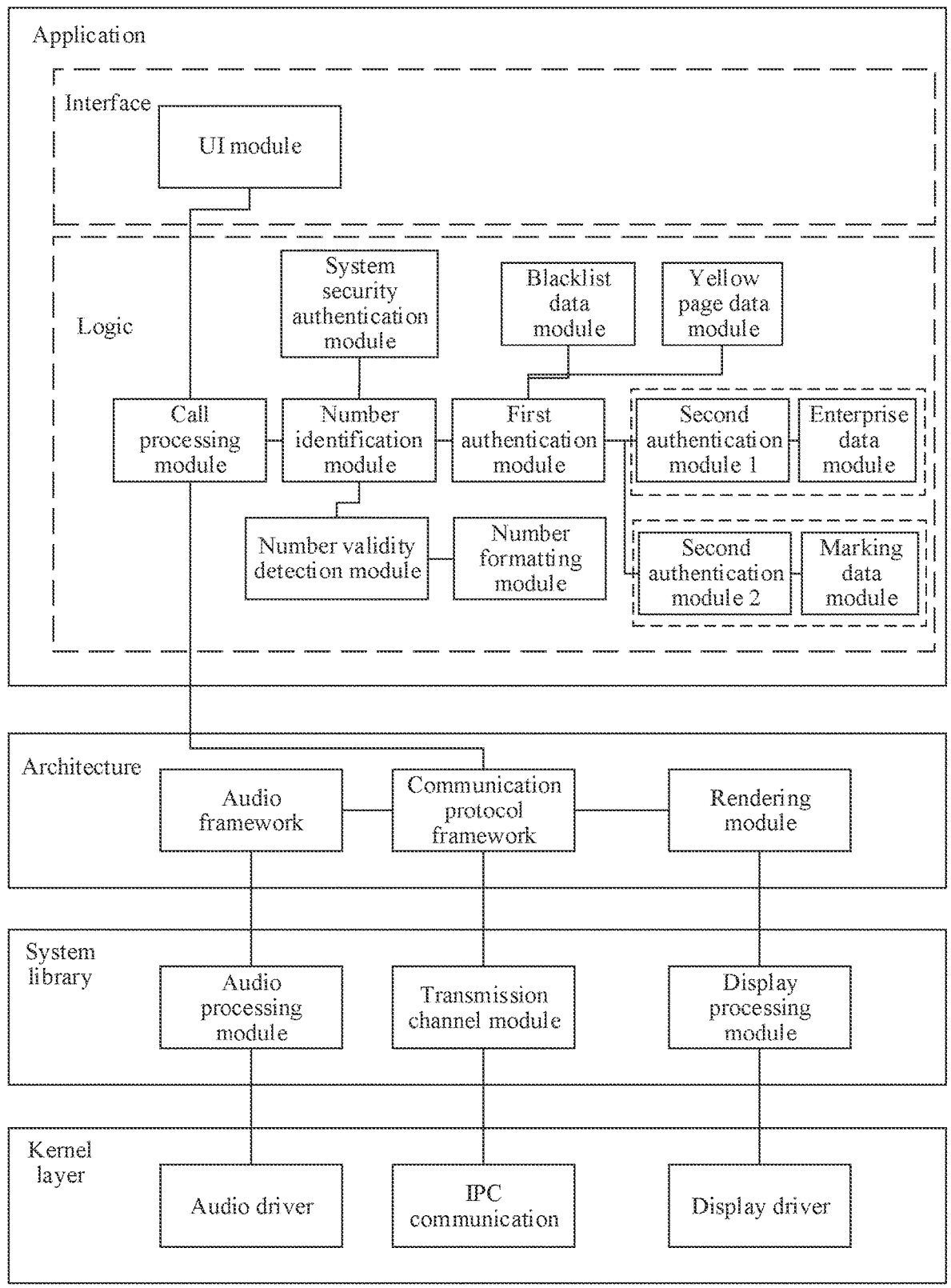
FIG. 15 is a block diagram of a software structure of an electronic device according to this application.

If the electronic device obtains, from a plurality of data sources, the user description information corresponding to the first electronic device, for example, the plurality of data sources are a yellow page application, a blacklist application, a number marking application, and a communication application. The yellow page application and the blacklist application are system applications, and a schematic diagram of a software structure of an electronic device is shown in FIG. 15. In this case, the number identification module may separately obtain, from a data module of each application, user marking information corresponding to the first phone number. For a specific processing procedure between modules, refer to FIG. 11 to FIG. 14, and details are not described herein again.

Figure 16:
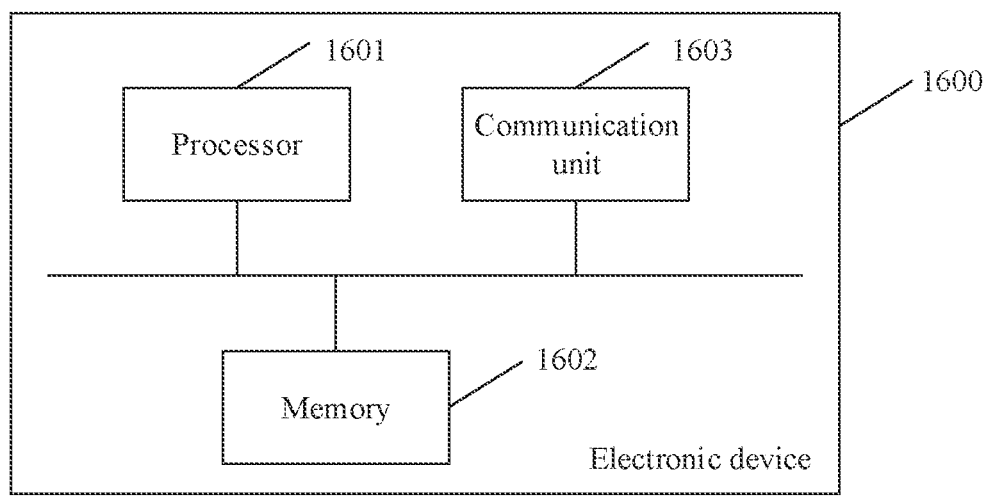
FIG. 16 is a schematic structural diagram of an embodiment of an electronic device according to this application.

Corresponding to the foregoing embodiment, this application further provides an electronic device. FIG. 16 is a schematic diagram of structure of an electronic device according to an embodiment of the present disclosure. An electronic device 1600 may include a processor 1601, a memory 1602, and a communication unit 1603. The processor 1601, the memory 1602, and the communication unit 1603 may communicate with each other and transfer a control and/or data signal through an internal connection path. The memory 1602 is configured to store a computer program, and the processor 1601 is configured to invoke and run the computer program from the memory 1602.

The communication unit 1603 is configured to establish a communication channel, so that the electronic device can communicate with another device.

The processor 1601 is a control center of a storage device, is connected to all parts of the entire electronic device by using various interfaces and lines, and performs various functions of the electronic device and/or processes data by running or executing a software program and/or a module stored in the memory 1602 and invoking data stored in the memory.

The memory 1602 may be a read-only memory (ROM), another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium, or another magnetic storage device, or may be any other medium that can be used to carry or store expected program code in a form of an instruction or a data structure and that can be accessed by a computer.

The processor 1601 and the memory 1602 may synthesize a processing apparatus. More commonly, they are separate components. The processor 1601 is configured to execute program code stored in the memory 1602 to implement the foregoing function. In specific implementation, the memory 1602 may be integrated in the processor 1601, or may be independent of the processor 1601.

When an execution instruction in the memory 1602 is executed by the processor 1601, the electronic device 1600 may perform some or all steps in the foregoing embodiment shown in FIG. 2A to FIG. 14. For details, refer to the foregoing embodiment, and details are not described herein again.

This application further provides an electronic device, where the device includes a storage medium and a central processing unit. The storage medium may be a non-volatile storage medium, and a computer executable program is stored in the storage medium. The central processing unit is connected to the non-volatile storage medium, and the computer executable program is executed to implement the method provided in the embodiment shown in FIG. 2A to FIG. 14 in this application.

An embodiment of this application further provides a computer-readable storage medium. A computer program is stored in the computer-readable storage medium. When the computer program runs on a computer, the computer executes the method provided in the embodiment shown in FIG. 2A to FIG. 14 in this application.

An embodiment of this application further provides a computer program product. The computer program product includes a computer program. When the computer program runs on a computer, the computer executes the method provided in the embodiment shown in FIG. 2A to FIG. 14 in this application.

In this embodiment of this application, "at least one" refers to one or more, and "a plurality of" refers to two or more. "And/or" describes an association relationship of associated objects, indicating that there may be three relationships. For example, A and/or B may indicate that A exists alone, A and B exist simultaneously, and B exists alone. A and B may be singular or plural. A character "/" generally indicates that associated objects are in an "or" relationship. "At least one of the following items" and similar expressions indicate any combination of these items, including any combination of single or plural items. For example, at least one of a, b, and c may indicate a, b, c, a and b, a and c, b and c, or a, b and c, where quantities of a, b, and c may be one or more.

Persons of ordinary skill in the art may recognize that units and algorithm steps described in the embodiments disclosed in this specification may be implemented by combining electronic hardware, computer software, and electronic hardware. Whether these functions are performed in hardware or software depends on a specific application and design constraints of the technical solution. Persons skilled in the art may use different methods for each specific application to implement the described functions, but this implementation should not be considered to be beyond the scope of this application.

It may be clearly understood by persons skilled in the art that, for convenience and brevity of description, for a specific working process of the foregoing described system, apparatus, and unit, reference may be made to a corresponding process in the foregoing method embodiments, and details are not described herein again.

In the several embodiments provided in this application, any function that is implemented in a form of a software functional unit and sold or used as an independent product may be stored in a computer-readable storage medium. Based on such understanding, the technical solutions of this application essentially, or the part contributing to the prior art, or the part of the technical solutions may be implemented in a form of a software product. The computer software product is stored in a storage medium and includes several instructions for instructing a computer device (which may be a personal computer, a server, or a network device) to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:
1. An interface display method, comprising:
obtaining, by a call application, a first phone number of a peer end of a call;
successfully authenticating, by the call application, a first data source application, wherein successfully authenticating the first data source application comprises:
  obtaining, by the call application, authentication information of the first data source application, wherein the authentication information comprises a packet name and a signature, and wherein the packet name is a unique identifier for identifying an electronic device, and the signature is a unique identifier for identifying an application developer;
  searching, by the call application, for the packet name in a preset whitelist; and
  based on the packet name being found in the preset whitelist, determining, by the call application, that a signature corresponding to the packet name in the preset whitelist is consistent with the signature in the authentication information;
after the first data source application is authenticated successfully, obtaining, by the call application from the first data source application, first user description information corresponding to the first phone number, wherein the first user description information is used to record information about a user corresponding to the first phone number; and
displaying, by the call application, the first user description information in a call-related interface of the first phone number.

2. The method according to claim 1, wherein the obtaining; the first user description information corresponding to the first phone number comprises:
    sending, by the call application, a first message to the first data source application, wherein the first message comprises the first phone number, and the first message is used to request the first user description information corresponding to the first phone number; and
    receiving, by the call application, a second message from the first data source application, wherein the second message comprises the first user description information.

3. The method according to claim 2, wherein before the receiving the second message from the first data source application, the method further comprises:
    sending, by the call application, an authentication request message to the first data source application, wherein the authentication request message comprises authentication information of the call application, so that the first data source application successfully authenticates the authentication information of the call application.

4. The method according to claim 3, further comprising:
    obtaining, by the call application from at least one data source application, user description information corresponding to the first phone number, wherein the user description information is used to record information about the user corresponding to the first phone number, and the at least one data source application is different from the first data source application; and
    displaying, by the call application, the user description information obtained from the at least one data source application in the call-related interface of the first phone number.

5. The method according to claim 4, wherein the displaying the first user description information and the user description information obtained from the at least one data source application in the call-related interface of the first phone number comprises:
    selecting, by the call application, at least one piece of user description information from the first user description information and the user description information obtained from the at least one data source application, and displaying the at least one piece of user description information in the call-related interface.

6. The method according to claim 4, wherein the displaying the first user description information and the user description information obtained from the at least one data source application in the call-related interface of the first phone number comprises:
    successively displaying, by the call application, the first user description information and the user description information obtained from the at least one data source application in the call-related interface in a specified sequence; or
    displaying, by the call application, the first user description information and the user description information obtained from the at least one data source application in different specified areas of the call-related interface in a specified sequence.

7. The method according to claim 6, wherein the specified sequence comprises:
    a preset priority sequence of the first data source application and the at least one data source application; or
    a time sequence in which the user description information is obtained from the first data source application and the at least one data source application.

8. The method according to claim 3, further comprising:
    based on the user description information corresponding to the first phone number not being obtained from the first data source application, obtaining, by the call application, second user description information corresponding to the first phone number from a second data source, wherein the second user description information is used to record information about the user corresponding to the first phone number, and the second data source is different from the first data source application; and
    displaying, by the call application, the second user description information in the call-related interface of the first phone number.

9. The method according to claim 8,
    wherein the first data source application comprises a communication application, a yellow page application, a blacklist application, a number marking application, or a cloud server, wherein the cloud server records user description information corresponding to a phone number;
    wherein the second data source comprises an address book of an electronic device, the communication application, the blacklist application, the number marking application, or the cloud server; and
    wherein the user description information comprises at least one of employee information, merchant information, marking information, or blacklist information.

10. The method according to claim 1, wherein before the first data source application is authenticated successfully, the method further comprises:
    determining, by the call application, that the first data source application is in a logged-in state.

11. The method according to claim 1, wherein before the first data source application is authenticated successfully, the method further comprises:
    determining, by the call application, that the first phone number is not stored in an address book of an electronic device.

12. The method according to claim 1, wherein after the displaying the first user description information in the call-related interface of the first phone number, the method further comprises:
    storing, by the call application, the first user description information in a call record of the first phone number; and
    receiving, by the call application, a call record query operation for the first phone number, and displaying the first user description information in a call record display interface of the first phone number.

13. The method according to claim 12, wherein after the receiving the call record query operation for the first phone number, and before the displaying the first user description information in the call record display interface of the first phone number, the method further comprises:
    detecting, by the call application, that an account currently logged in by the first data source application is a first account, wherein the first account is an account logged in by the first data source application when the first user description information is obtained from the first data source application.

14. The method according to claim 13, further comprising:
    based on detecting that an account currently logged in by the first data source application is switched to a second account, obtaining, by the call application from the first data source application that has logged in to the second account, third user description information corresponding to the first phone number; and displaying, by the call application, the third user description information in the call record display interface of the first phone number.

15. The method according to claim 1, further comprising:
based on user description information being displayed in the call-related interface, correspondingly displaying information about a data source to which the user description information belongs, wherein the user description information comprises the first user description information.

16. An electronic device, comprising:
a memory configured to store computer program instructions; and
a processor configured to execute the computer program instructions, such that the computer program instructions being executed by the processor cause the electronic device to execute a method comprising:
  obtaining, by a call application, a first phone number of a peer end of a call;
  successfully authenticating, by the call application, a first data source application, wherein successfully authenticating the first data source application comprises:
    obtaining, by the call application, authentication information of the first data source application, wherein the authentication information comprises a packet name and a signature, and wherein the packet name is a unique identifier for identifying an electronic device, and the signature is a unique identifier for identifying an application developer;
    searching, by the call application, for the packet name in a preset whitelist; and
    based on the packet name being found in the preset whitelist, determining, by the call application, that a signature corresponding to the packet name in the preset whitelist is consistent with the signature in the authentication information:
  after the first data source application is authenticated successfully, obtaining, by the call application from the first data source application, first user description information corresponding to the first phone number, wherein the first user description information is used to record information about a user corresponding to the first phone number; and
  displaying, by the call application, the first user description information in a call-related interface of the first phone number.

17. The electronic device according to claim 16, wherein the obtaining the first user description information corresponding to the first phone number comprises:
  sending, by the call application, a first message to the first data source application, wherein the first message comprises the first phone number, and the first message is used to request the first user description information corresponding to the first phone number; and
  receiving, by the call application, a second message from the first data source application, wherein the second message comprises the first user description information.

18. The electronic device according to claim 17, wherein before the receiving the second message from the first data source application, the processor is configured to execute the computer program instructions to further cause the electronic device to:
  send, by the call application, an authentication request message to the first data source application, wherein the authentication request message comprises authentication information of the call application, so that the first data source application successfully authenticates the authentication information of the call application.

19. The electronic device according to claim 18, wherein the processor is configured to execute the computer program instructions to further cause the electronic device to:
  obtain, by the call application from at least one data source application, user description information corresponding to the first phone number, wherein the user description information is used to record information about the user corresponding to the first phone number, and the at least one data source application is different from the first data source application; and
  display, by the call application, the user description information obtained from the at least one data source application in the call-related interface of the first phone number.

20. A non-transitory computer-readable storage medium, wherein a computer program is stored in the computer-readable storage medium, and based on the computer program being executed on a computer, the computer is enabled to execute a method comprising:
  obtaining, by a call application, a first phone number of a peer end of a call;
  successfully authenticating, by the call application, a first data source application, wherein successfully authenticating the first data source application comprises:
    obtaining, by the call application, authentication information of the first data source application, wherein the authentication information comprises a packet name and a signature, and wherein the packet name is a unique identifier for identifying an electronic device, and the signature is a unique identifier for identifying an application developer;
    searching, by the call application, for the packet name in a preset whitelist; and
    based on the packet name being found in the preset whitelist, determining, by the call application, that a signature corresponding to the packet name in the preset whitelist is consistent with the signature in the authentication information;
  after the first data source application is authenticated successfully, obtaining, by the call application from the first data source application, first user description information corresponding to the first phone number, wherein the first user description information is used to record information about a user corresponding to the first phone number; and
  displaying, by the call application, the first user description information in a call-related interface of the first phone number.

* * * * *